(12) United States Patent
Levin et al.

(10) Patent No.: US 10,738,865 B2
(45) Date of Patent: Aug. 11, 2020

(54) ANTI-BACKLASH DEVICE AND METHOD

(71) Applicant: CONCEPT & DESIGN LTD, Atlit (IL)

(72) Inventors: Shalom Levin, Atlit (IL); Asaf Levin, Atlit (IL)

(73) Assignee: CONCEPT & DESIGN LTD, Atlit (IL)

( * ) Notice: Subject to any disclaimer, the term of this patent is extended or adjusted under 35 U.S.C. 154(b) by 0 days.

(21) Appl. No.: 16/551,766

(22) Filed: Aug. 27, 2019

(65) Prior Publication Data

US 2019/0383369 A1 Dec. 19, 2019

Related U.S. Application Data

(63) Continuation of application No. PCT/IL2018/050151, filed on Feb. 11, 2018.

(60) Provisional application No. 62/523,267, filed on Jun. 22, 2017, provisional application No. 62/463,733, filed on Feb. 27, 2017.

(51) Int. Cl.
*F16H 25/20* (2006.01)
*F16H 25/22* (2006.01)
*F16H 25/24* (2006.01)

(52) U.S. Cl.
CPC ..... *F16H 25/2003* (2013.01); *F16H 25/2214* (2013.01); *F16H 2025/2028* (2013.01); *F16H 2025/2481* (2013.01)

(58) Field of Classification Search
None
See application file for complete search history.

(56) References Cited

U.S. PATENT DOCUMENTS

| 2,855,791 | A |   | 10/1958 | Hogan |   |
|---|---|---|---|---|---|
| 3,258,983 | A |   | 7/1966 | Valenti |   |
| 3,975,968 | A | * | 8/1976 | Chaffin | B23Q 5/56 74/441 |
| 4,116,112 | A | * | 9/1978 | Hampejs | F15B 9/12 91/380 |

(Continued)

FOREIGN PATENT DOCUMENTS

| JP | 3715038 | 7/1996 |
| JP | 2000257631 | 8/1999 |
| WO | WO99/63248 | 12/1999 |

OTHER PUBLICATIONS

International Search Report of PCT/IL2018/050151, dated Sep. 7, 2018.

(Continued)

*Primary Examiner* — William Kelleher
*Assistant Examiner* — Gregory T Prather
(74) *Attorney, Agent, or Firm* — Pearl Cohen Zedek Latzer Baratz LLP

(57) ABSTRACT

An anti-backlash device for preventing backlash derived from a moving load on a screw used in converting rotary motion into linear motion, the anti-backlash device comprising: a cylindrical pressure actuator integrally formed with a helical thread and axially mounted on the screw; a cradle integrally formed with a helical thread and internal cradle threads, the cradle being mounted exterior to and in mechanical contact with both the cylindrical pressure actuator and the screw, and a preloading means comprising a wave spring and a retainer mounted in the cradle.

17 Claims, 22 Drawing Sheets

(56) References Cited

U.S. PATENT DOCUMENTS

| | | | | |
|---|---|---|---|---|
| 4,717,219 | A | * | 1/1988 | Frantz ................. H05K 7/12 411/80.2 |
| 4,872,795 | A | | 10/1989 | Davis |
| 5,090,265 | A | * | 2/1992 | Slocum ................. B23Q 5/40 384/123 |
| 5,381,630 | A | * | 1/1995 | Kinner ................. B24B 7/17 451/63 |
| 6,041,671 | A | | 3/2000 | Erickson et al. |
| 6,142,032 | A | | 11/2000 | Creager |
| 6,311,575 | B1 | * | 11/2001 | Erker ................. F16H 25/24 74/89.36 |
| 9,279,487 | B1 | * | 3/2016 | Guglietti ............ F16H 25/2214 |
| 9,366,288 | B2 | * | 6/2016 | Laszlo ................. B62D 5/0448 |
| 2004/0200303 | A1 | * | 10/2004 | Inoue ................. F16H 25/2204 74/424.75 |
| 2007/0196189 | A1 | | 8/2007 | Sugita |
| 2009/0071272 | A1 | * | 3/2009 | Lin .................... F16H 25/2214 74/89.44 |
| 2012/0079901 | A1 | * | 4/2012 | Shu ................... F15B 15/068 74/89.14 |
| 2013/0031995 | A1 | * | 2/2013 | Chen ................. F16H 25/2214 74/424.83 |
| 2015/0240924 | A1 | * | 8/2015 | Lee ................... F16H 25/24 74/89.36 |
| 2019/0226516 | A1 | * | 7/2019 | Nakayama ............ F16B 37/02 |

OTHER PUBLICATIONS

Great Britain Search Report for Application No. GB1802381.2, dated Aug. 6, 2018.

P.Scott, "Ball-screw basics: Debunking the myths", Jul. 8, 2004, downloaded on Aug. 26, 2019 from Machine Design, website: https://www.machinedesign.com/mechanical-drives/ball-screw-basics-debunking-myths.

* cited by examiner

CROSS SECTION C-C

CROSS SECTION D-D

ANTI-BACKLASH DEVICE AND METHOD

CROSS-REFERENCE TO RELATED APPLICATIONS

This application is a Continuation Application of PCT International Application No. PCT/IL2018/050151, International Filing Date Feb. 11, 2018, claiming the benefit of U.S. Provisional Patent Applications No. 62/463,733, filed Feb. 27, 2017, and No. 62/523,267 filed on Jun. 22, 2017, which are hereby incorporated by reference.

FIELD OF THE INVENTION

The present invention generally relates to the field of anti-backlash devices for preventing backlash in screws used in translating rotary motion into linear motion, and in particular, to an anti-backlash roller screw device.

BACKGROUND

There are two major types of screw and nut mechanisms: a first type utilizes a popular Acme lead screw while a second type utilizes a ball screw. Both of these screw types are generally known to operate with inefficiency due to backlash effects that generally arise in rotatable mechanical components. Although attempts have been made to alleviate this condition, there is still much room for improvement.

In the prior art, the first type of screw—the Acme screw—has difficulty maintaining efficient rotation without pitch deviation and/or backlash, but these difficulties are somewhat easier to overcome than in the second type of screw, since there is not the complication engendered by a quantity of rolling balls that also need to be controlled. The Acme lead screw, however, is considered to be less efficient than any ball screws.

Acme lead screw and nut devices generally suffer from a very low efficiency which is around 50%, as compared to ball screw and nut devices. The prior art anti-backlash screw and nut devices for Acme lead screws are very bulky and large in volume.

Ball screws which are used to convert rotary input into linear output motion are considerably more efficient and more accurate than Acme lead screws and many other kinds of actuators, such as a belt, a cable, chain drives, and the like. For this reason, therefore, they are extensively used in many applications: in the automobile industry, in electronic equipment, in engineering machinery, in CNC machine tools, in the field of automation, in the railroad industry, in medical equipment, and in many others.

In the prior art, the second type of screw—the ball screw—is used in screw and nut mechanisms where the screw and nut are provided with matching helical grooves or races which are used to retain a plurality of rolling balls and allow them to roll in these grooves so as to load the screw and nut assembly. Each of the balls generally provides dual points of contact being positioned between the screw and nut, although the mechanism in some prior art configurations can be made to increase the number of contact points further in order to increase the load capacity of the mechanism for heavy duty applications (see FIG. 3).

For ball screws, there are generally two types of ball return systems in the prior art. In the first type, the balls are returned to a starting point in the active circle—i.e., the path where the balls provide the load which is disposed external to the outside diameter of the ball nut (see U.S. Pat. No. 2,855,791 to W. H. Hogan as shown by way of example in FIG. 1 of the present invention).

In the second type of ball return system, the balls are returned in an internal pathway provided inside the diameter of the outer wall of the nut (see example from Barnes Industries shown in FIG. 2). There are several alternate return systems to the second type of ball return system. For example, the balls make one helical circuit around the ball screw in what is called an active circle and then are made to cross-over into an adjacent groove above the outside diameter of an adjacent thread to return to the active circle for the next cycle of activity. This is called a cross-over or "flop over" design (Rotex of England) internal return system. A deflecting means, such as a tab deflector supported by the nut is used to redirect the balls along the return pathway. Another alternate return system is called the tangential internal ball return system (Barnes Industries). A V-cap is used to return the balls to the active circle on an opposite side of the circuit inside a bore just below the outer wall of the nut.

Ball screws are often manufactured with a one-start, two-starts, or multi-start screw. This refers to the number of independent threads on the shaft of the screw. In some applications, additional series of rolling balls accommodated in the multiple pathways of multi-start screws are used to increase the load linear speed of the ball screw and nut where a large pitch is needed for the ball screw for higher speed applications.

Ball screws are subject to degradation and wear from many causes as in most mechanical systems, but they generally last much longer than simpler Acme screw and nut mechanisms and can operate at higher speeds and on heavier loads. Nevertheless, prior art screw and nut assemblies are very sensitive to temperature change, as well as to problems from thread profile and pitch deviation, the latter problem generally occurring relatively frequently in large volume production.

Both prior art Acme lead screws and ball screws suffer from backlash—the free axial movement of the central screw in the former type of screw assembly, and the motion of balls along the screw threads in the latter. Most backlash effects occur between the screw and nut.

It is important to optimize performance by eliminating or at least minimizing this backlash. One way to do this, as is known to those skilled in the prior art, is to preload the nut. The nut is loaded so as to apply pressure on the screw threads in the direction opposite the working load and without allowing freedom of movement in between the screw and the nut. There are several ways that this is done as will be described hereinafter in the detailed description of the prior art in reference to FIG. 3.

Prior-art ball screws, those with an external return tube, are designed having a minimum 540 degree active ball circle (i.e., 360+180) comprising movement along one and a half threads. On the other hand, those prior-art ball screws with an internal return pathway have only about a 300 degree active ball circuit. It is important to control the rolling pathway for the balls that helically encircle a ball screw fitted with a complementary nut so that unnecessary rolling motion does not cause asymmetrical inefficiency in the active circle.

Accordingly, it is a broad object of the present invention to overcome the above disadvantages and limitations of the prior art by providing an anti-backlash device and a method suitable for use with both an Acme lead screw and a conventional ball screw.

It is another object of the present invention to provide an anti-backlash device wherein only one face of a cradle thread is required to be accurately machined, whereas the other components may be made of relatively less accurate machined parts.

Still another object of the invention is to provide a full, helical, active circle of about 360-degrees for a plurality of shaped rollers in order to provide a symmetrical balanced load on the roller screw component utilizing an anti-backlash device.

Yet another object of the present invention is to provide a full, helical, returning circuit of about 360-degrees for a plurality of shaped rollers.

Still another object of the present invention is to provide a compact, lightweight and less bulky anti-backlash device.

A further object of the present invention is to provide a low-cost and low-friction anti-backlash device.

Therefore there is provided an anti-backlash device for preventing backlash in a screw and nut mechanism having helical threads and used in converting rotary motion into linear motion, the anti-backlash device comprising:

a cylindrical, pressure actuator mounted around the screw and integrally formed with a helical thread; and a cylindrical cradle integrally formed with a helical, internal thread for meshing with the helical screw threads, the cradle being mounted around the screw exterior to and in close proximity to the pressure actuator, wherein both the pressure actuator and cradle each have only one accurately machined face axially oriented inward toward the screw, and wherein when the screw is operated to rotate within the cradle, the helical, pressure actuator thread is loaded on the helical screw thread so as to exert pressure thereon in a first axial direction, while simultaneously pressure is applied in an opposing, second axial direction by the cradle internal thread when loaded on the helical screw thread thereby applying a predetermined, axial, balanced force on the screw so as to prevent backlash.

SUMMARY OF THE INVENTION

It should be understood that, although the first type of screw mentioned in the background as prior art is commonly referred to as a 'ball' screw—i.e., it is provided with ball bearings in the grooves of the screw to reduce friction in the races when the screw rotates—hereinafter, unless specifically referring to ball screws with such ball rollers, the broader terms 'roller screw' and 'shaped rollers' (or simply 'rollers') will be used in order to introduce the use of other roller shapes as described in various embodiments of the present invention.

In the present invention, rollers are provided in various shapes and arrangements to address given applications as described in the different embodiments of the anti-backlash device. The scope of the present invention is intended to encompass these diverse shapes of rollers and diverse screw and nut threads that can, in the case of ball screws, retain such a wide variety of rollers. A few examples of various embodiments are herein presented as representative of the different, possible shapes and arrangements of rollers and it should not be construed to limit them to just those described by way of example only, including coin-shaped rollers with a cylindrical profile, diamond-shaped rollers, and ball-shaped rollers.

The anti-backlash device of the present invention comprises a compact, low-cost, backlash-free device as compared with the prior art. Rollers within a full, helical, active circle of about 360 degrees provide the load and an anti-backlash function, and the rollers are returned within about a 360-degree tangential recycling pathway. The recycling pathway for the rollers maintains them in their original orientation all along the active helical circle and through the full path of the returning helical circuit.

A distinct advantage of the present invention over the prior art is that only one face of the cradle and only one face of the pressure plate, are required to be accurately machined, whereas the other components of the present invention may be made of relatively less precisely machined parts. Furthermore, the cross-sectional profile of both the screw thread and the corresponding nut thread are not identical as they are in the prior art.

Furthermore, the preload feature of the anti-backlash device of the present invention as used in a screw and nut mechanism is not sensitive to temperature change nor to deviations of the screw pitch and profile. Advantageously, the idle rotating friction (Hertz contact effect) of the present invention is the lowest in the group comprising prior art anti-backlash ball screws. Also, compared to prior-art ball screws, the contact angle of the rollers is much smaller than that of the nut in ball screws from the prior art and therefore able to support heavier loads.

The present invention introduces the innovative concept of a cradle formed with an internal helical thread and a pressure actuator assembly having a pressure actuator also formed with an internal helical thread that, in combination around a screw, are operable to apply a predetermined axial balanced force on the screw so as to restrain any possible backlash effect.

The present invention is operable, by way of example, in a number of variations as detailed in the dependent claims based upon the nature of the screw component. In addition to the innovative anti-backlash device of the present invention, the anti-backlash features may also be used with an Acme (lead) screw (see FIG. 21).

BRIEF DESCRIPTION OF THE DRAWINGS

For a better understanding of the invention with regard to the embodiments thereof, reference is made to the accompanying drawings, in which like numerals designate corresponding elements or sections throughout and wherein.

DETAILED DESCRIPTION OF THE INVENTION

Figure 1:
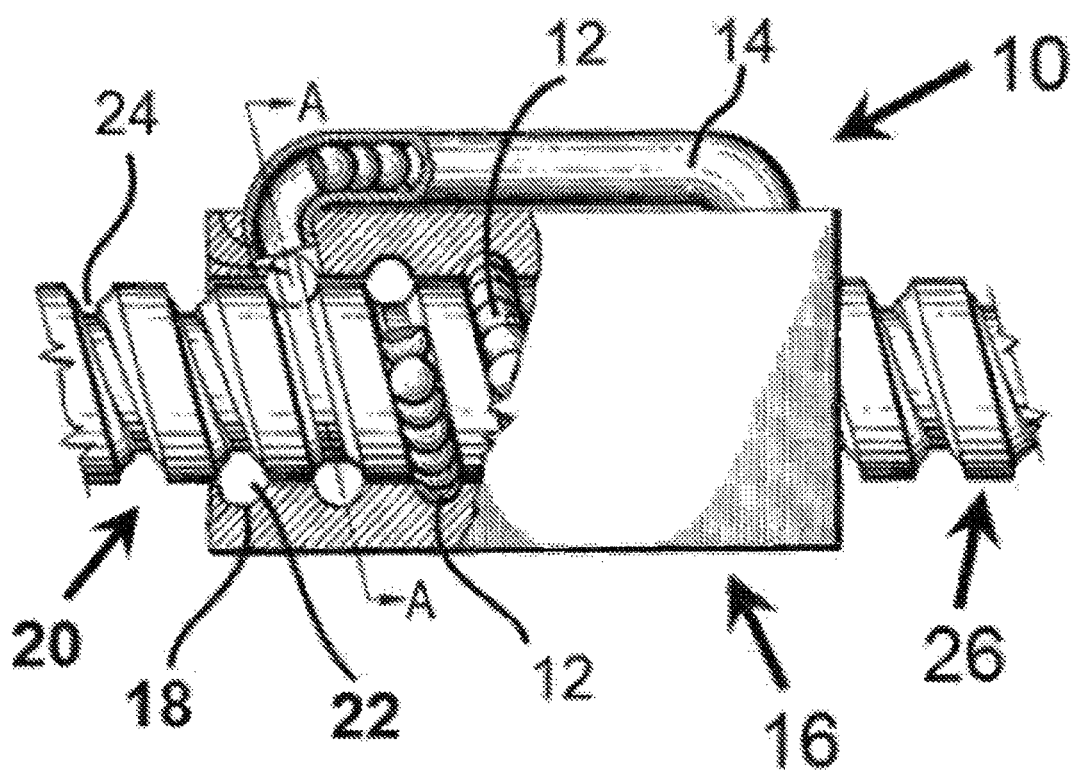
FIG. 1 is a partial cutaway, orthographic view, and a cross-sectional view A-A thereof, of a prior art anti-backlash ball screw and nut mechanism illustrating an external method of recycling the ball rollers through a tube disposed along the outside diameter of the nut body.
Figure 1:
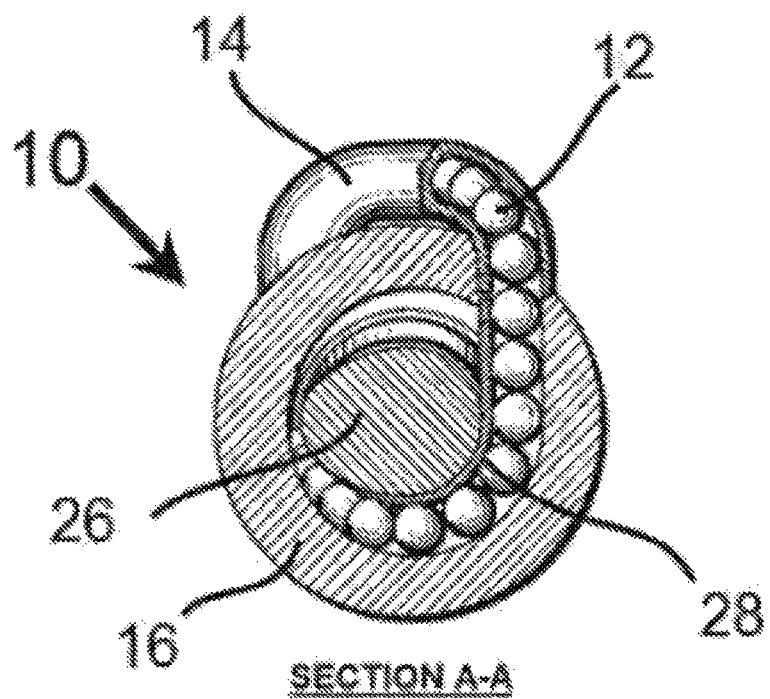

FIG. 1 is a partial cutaway, orthographic view, and a cross-sectional view A-A thereof, of a prior art ball screw device 10 exemplifying an external, ball-return system as is commonly known to those skilled in the prior art. The plurality of balls 12 are recycled through an externally mounted return tube 14 disposed tangentially along the outside diameter of a nut 16 whose internally disposed thread grooves 18 complement the screw thread grooves 20 to form internal, helical, ball channels 22 in nut 16. This prior art ball screw device 10 is configured to allow the passage of the plurality of balls 12 from end to end of internal, helical, ball channels 22 via return tube 14 in a continuous circuit around ball roller screw 26 when the ball roller screw device 10 is operated.

Allowance is made for clearance for the plurality of balls 12 within ball channels 22 by providing necessary clearance recesses 24 at the bases of helical, screw thread grooves 20. A helical retaining member 28 (shown in section view A-A) is provided as a way to retain the plurality of balls 12 within helical, nut thread grooves 18 when recycled from return tube 14. (see U.S. Pat. No. 2,855,791 to Hogan).

Figure 2:
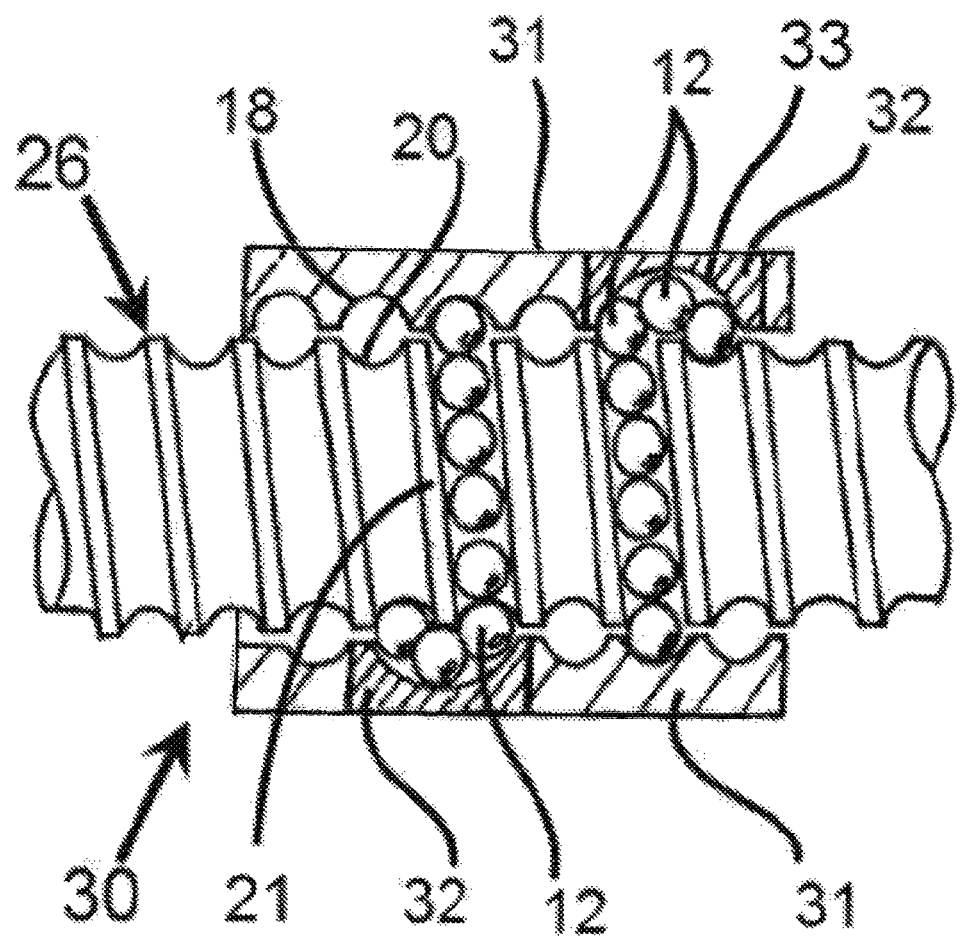
FIG. 2 is a general orthographic view of a prior art, anti-backlash ball screw and nut mechanism.

FIG. 2 is a general orthographic view of another embodiment of a prior art ball screw device 30 exemplifying an internal, cross-over type ball-return system as is commonly known to those skilled in the art. The internal system of recycling a plurality of ball rollers 12 utilizes a deflector element 32, having a concave surface 33 to enable cross-over of the plurality of ball rollers 12 within nut 31. The plurality of ball rollers 12 are directed by deflector element 32 to cross-over the large diameter roller screw thread 21 between adjacent ball screw thread grooves 20 by the matching of the concave, inner surface 33 of deflector element 32 and the roller screw thread grooves 20 which combine to form an internal-type return path for the plurality of ball rollers 12. Ball rollers 12 circle around ball roller screw 26 in a continuous, helical rolling motion when ball screw device 30 is operated. (see U.S. Pat. App. US20070196189 A1 to Su gita).

Figure 3:
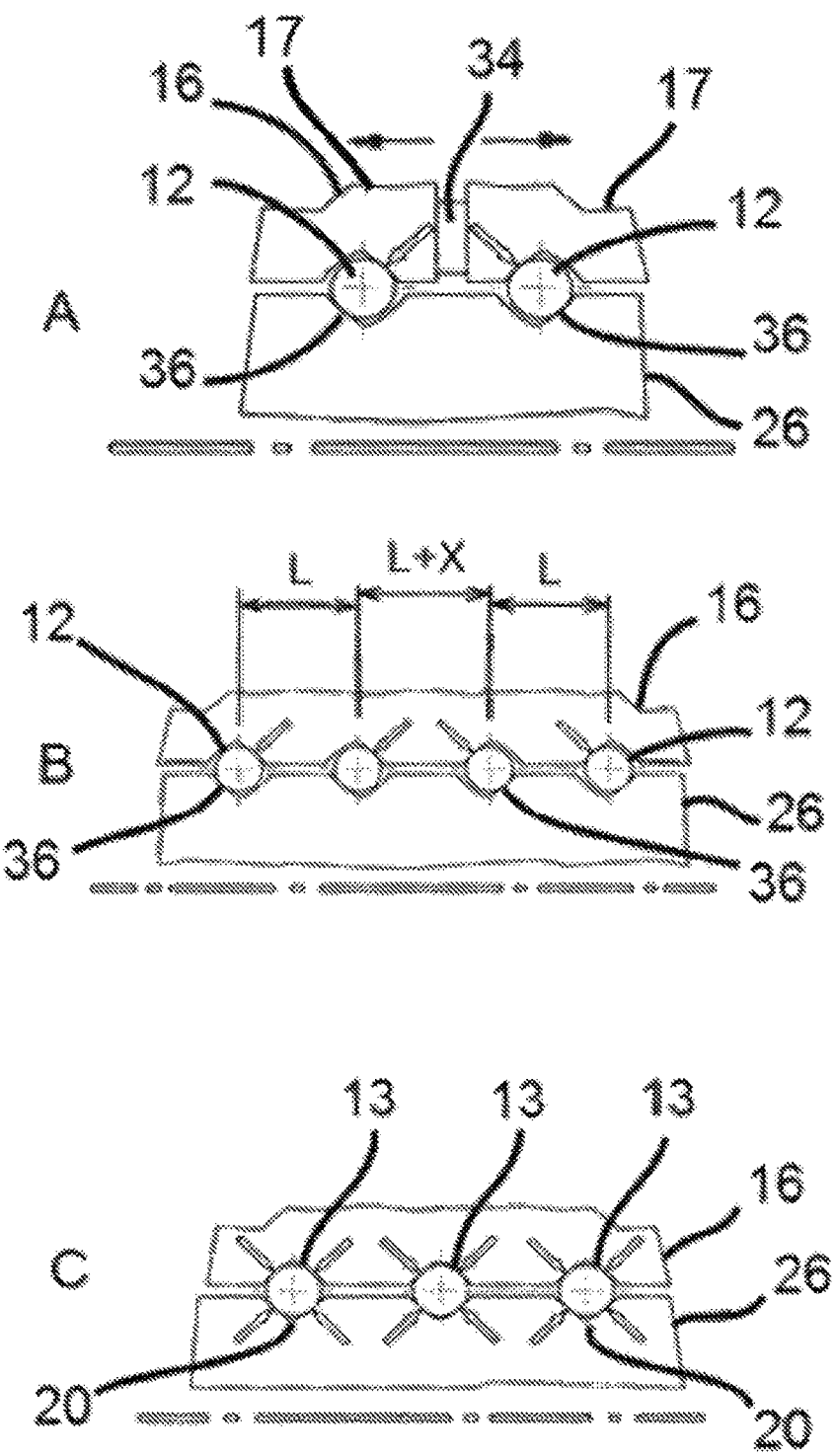
FIG. 3 is a schematic representation of three commonly used prior art methods for preloading ball screw and nut devices.

FIG. 3 is a schematic representation of three commonly used prior art methods for preloading ball screws. In each diagram, A, B, and C, the helical thread grooves in the outer-diameter surface of ball screw 26 are oriented to face matching helical thread grooves in the inner diameter faces of nuts 16, 17. The combination of screw and nut thread grooves defines the pathway for the plurality of roller balls 12, 13. A stylized broken line below each diagram graphically indicates the general position of the axis of ball roller screw 26 in relation to the respective diagrams. The methods A, B, and C each indicate by light arrows the angle and direction of the pressure applied to the plurality of ball rollers 12, 13 and dark arrows to indicate the direction of force by addition of loads, marked L on typical ball screw and nut devices in the prior art.

Note that method B indicates an increased middle pitch L+x which is the result of using an offset between two equal pitches L.

The double-nut method A uses double nuts 17 which are wedged together against a spacer 34 which locks them together. The spacer 34 applies force (shown by opposing arrows) to double nuts 17, which in turn transfers pressure (shown as light arrows) to a plurality of ball rollers 12 and to the contacts 36 with ball roller screw 26 to minimize backlash. Nevertheless, the double-nut method A has the disadvantage of high sensitivity to temperature changes which is problematic for efficient and effective operation of a ball screw device.

Alternatively, in a lead shift method B, an offset is provided in manufacturing the helical spiral of a screw race so that the angle of engagement (indicated by light arrows) of the nut 16 to the plurality of balls 12 has the same effect as using the double nut method A. But the contacts 36 between the plurality of ball rollers 12 and the ball roller screw 26 are still only point contacts and the angle of contact with the sides of the ball roller screw threads is less efficient than using other methods.

A third method in the prior art to load a plurality of ball rollers 13 on a ball screw 26 is called the 'ball-select method' C. It uses a plurality of over-sized balls 13 manufactured to precise diameters larger than the ball screw thread grooves 20. This forces the plurality of balls 13 into more contacts (indicated by light arrows) with ball screw 26 and nut 16 to eliminate backlash entirely. The disadvantage in this method is that not many manufacturers can meet the high tolerances required for using the ball-select method or the costs of machining the ball screw 26 and nut 16 to those tolerances.(adapted from "Ball-screw preload methods" found at: <http://machinedesign.com/mechanical-drives/ball-screw-basics-debunking-myths>).

Figure 4:
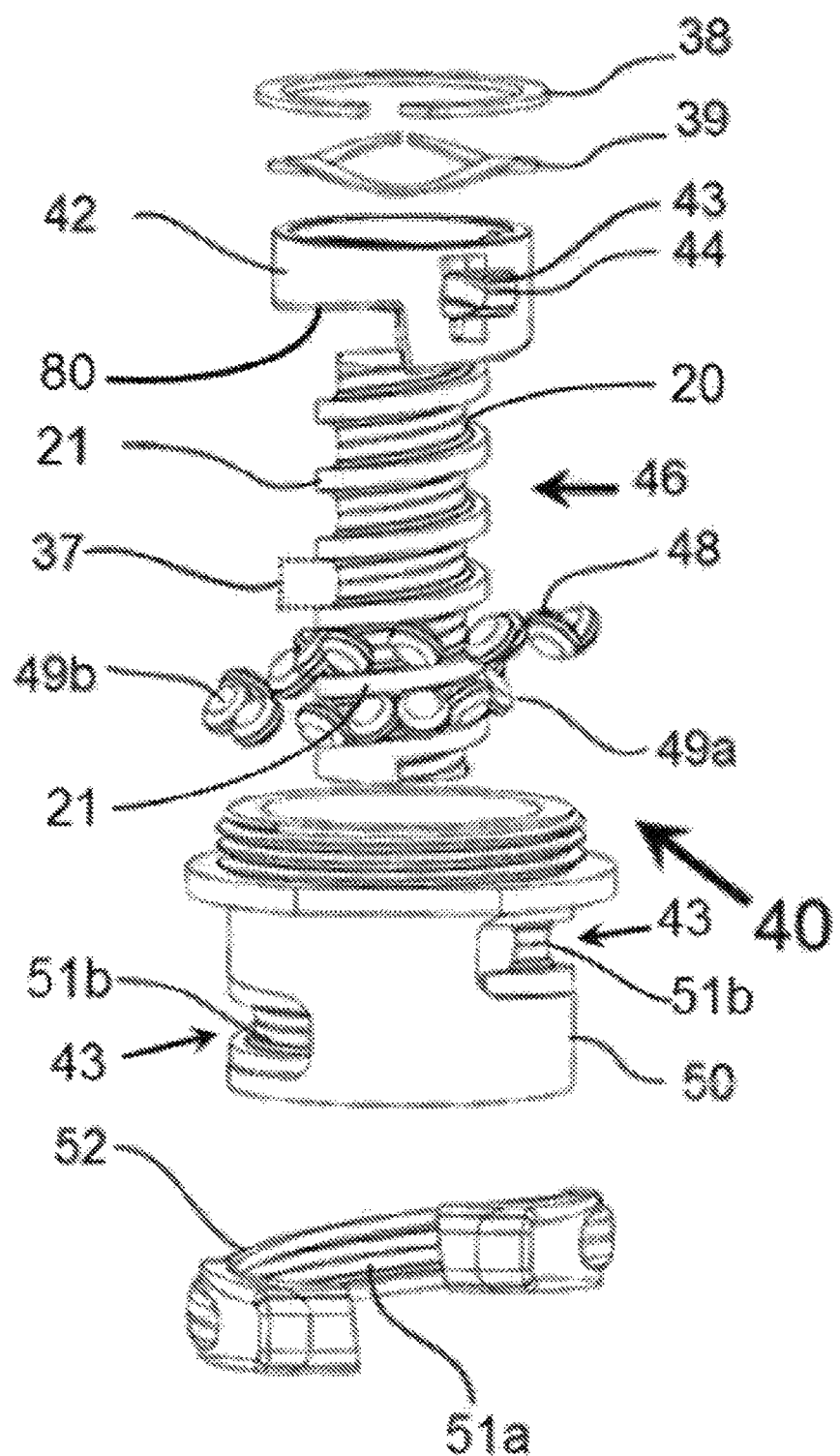
FIG. 4 is an exploded, orthographic view of a preferred embodiment of the anti-backlash device of the present invention.

FIG. 4 is an exploded view of a preferred embodiment of the present invention. The anti-backlash device 40 is provided with a plurality of diamond-shaped rollers 48. These are positioned within a single active circle 49a defined by the congruence in and matching of internal, screw thread grooves 37 (bracket with dashed lines indicates half-square profile) and corresponding cradle thread grooves 45 (not shown, but see FIG. 5).

This preferred embodiment anti-backlash device 40 of the present invention comprises a one-start screw 46 threaded into a cradle 50 which serves as a housing for the components of the anti-backlash device 40. The spring-driven pressure actuator 42, is formed with a helical, rolling surface 80, and provided with a wave spring 39 and retaining ring 38.

Screw 46 is provided with a semi-square thread profile (indicated by dashed bracket over screw thread groove 37) which serves to provide a cross-rollers arrangement for the diamond-shaped rollers 48 in order to further eliminate backlash. The diamond-shaped rollers 48 exert force on roller screw 46 from one side, and are pressured from cradle housing 50 on the opposite side, from the contact pressure applied by the helical, rolling surface 80 to the screw threads 21.

The larger diameter helical screw thread 21 helps retain the plurality of diamond-shaped rollers 48 in both an internal, active circle 49a and a returning circle 49b. The plurality of diamond-shaped rollers 48 remain in firm, line contact with the roller screw threads 21 while moving about the ball roller screw in about a 360 degree rotation. Additional diamond-shaped rollers 48 are arranged in contact with corresponding cradle threads 51b forming an external recycling circle 49b. The diamond-shaped rollers 48 are oriented in a 90-degree twist to each other. When pressure is applied to both sides of the larger diameter screw threads 21, the force is equalized on ball roller screw 46 to provide an anti-backlash effect in accordance with the principles of the present invention.

Deflector elements 44, partially visible in a cut-out window view 43 of the cylindrical pressure actuator 42, are shaped so as to deflect and recycle the plurality of diamond-shaped rollers 48 in the last active stage of operation by redirecting them from active circle 49a into an external returning circuit 49b defined by the congruence of cradle grooves 51b and retaining grooves 51a formed in a helical cradle cover 52 in the space between them end to end along the length of the helical returning circuit 49b.

The outer half 51a of helical returning circuit 49b is externally mounted on cradle 50 and covers the plurality of diamond-shaped rollers 48 within. The matching, inner half 51b of returning circuit 49b is shown, half-depth embedded in the cut-out view of window 43 in cradle 50 and defines the roller path between cradle 50 and external cover 52.

A preloading means, such as wave spring 39, is held in place by a retainer, such as split, retaining ring 38, which acts on cylindrical pressure actuator 42 to apply pressure utilizing the helical, rolling surface 80 (see FIG. 5) in a predetermined axial, balanced force on the plurality of diamond-shaped rollers 48, cradle 50 and roller screw 46 to eliminate backlash.

Figure 5:
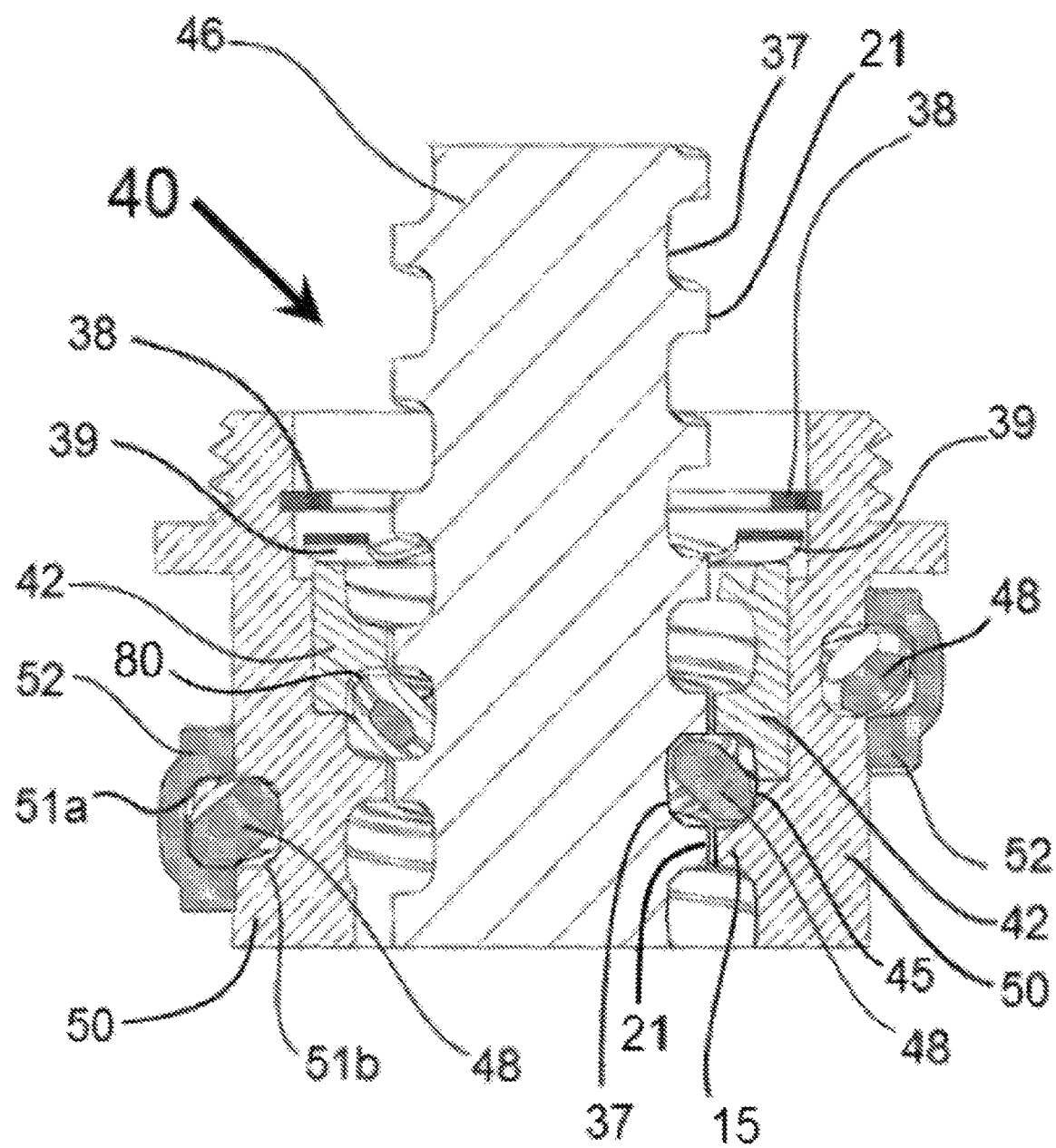
FIG. 5 is a sectional view of the assembled components of the preferred embodiment of the present invention illustrated in FIG. 4.

FIG. 5 is a sectional view of the assembled components of the preferred embodiment of the present invention described in FIG. 4. The anti-backlash device 40 comprises a roller screw 46 provided with semi-square thread profiles 37, that accommodate a plurality of diamond-shaped rollers 48 between the semi-square thread profiles 37 when mated with matching semi-square profile 45 comprised of a helical threaded portion of cradle 50 and/or pressure actuator 42.

When a force is applied to pressure actuator 42 by a preloading means, such as wave spring 39 kept in place by a retaining ring 38, force is applied from the pressure actuator helical rolling surface 80 to the plurality of diamond-shaped rollers 48 and from the grooves 37 of roller screw 46 and also from an opposing helical rolling surface 45 of cradle 50 to produce a balance of forces which eliminates backlash.

The cavity 51a provided in an externally mounted cover 52 (see FIG. 4) defines an outer-half-portion of a returning circle 49b (see FIG. 4) which is matched with an inner-half, cradle cavity 51b semi-embedded in cradle 50 to provide a full returning tunnel 51a/b for the plurality of diamond-shaped rollers 48. Note that the diamond-shaped rollers 48 are self-fitted in the semi-square screw thread profile 37 so as to be constrained within the active circle 49a (see FIG. 4) while in a continuous helical rolling motion between the combined helical thread grooves 37 of roller screw 46 and the cradle helical groove 51b in cooperation with the cover groove 52 which provides a helical external pathway for the shaped rollers 48.

Figure 6:
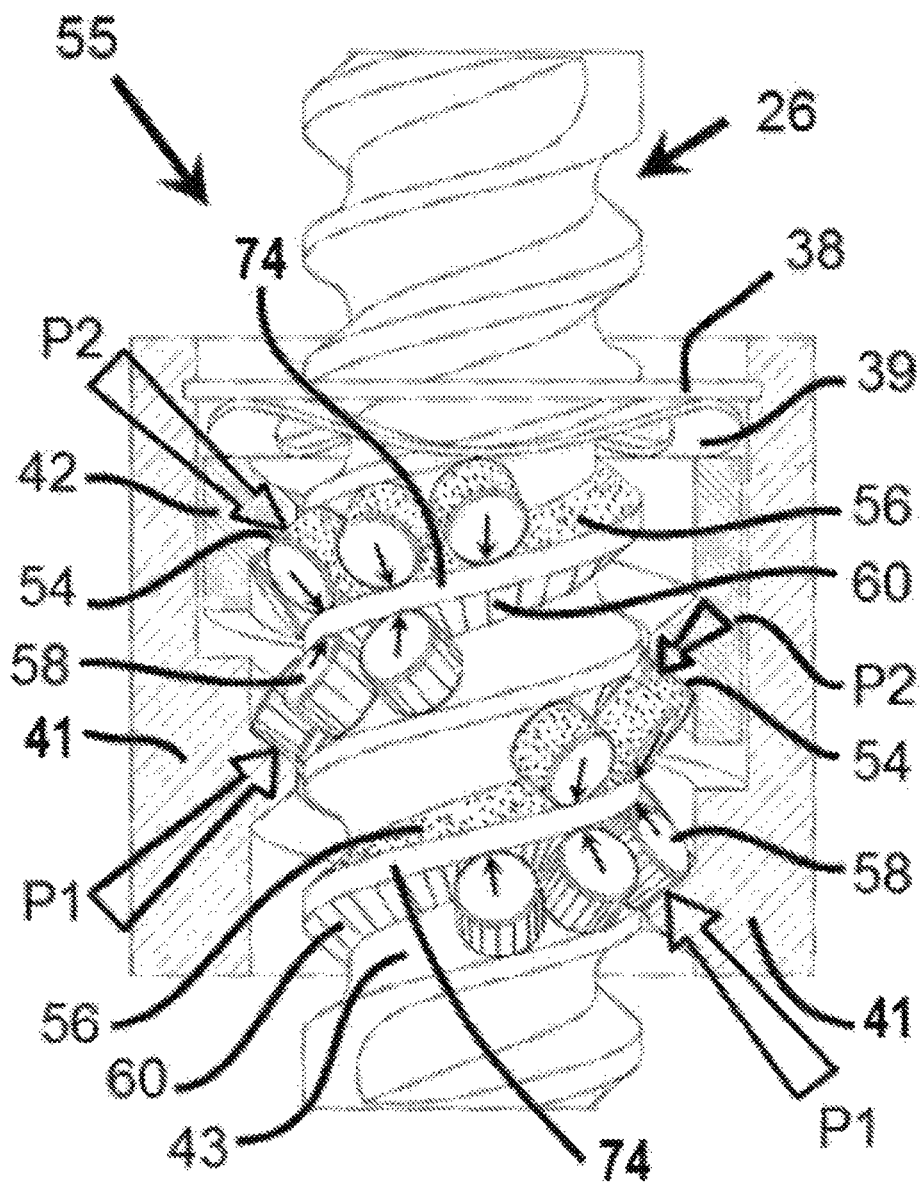
FIG. 6 is an orthographic view of another embodiment of the present invention depicting the method of operation of the components of an anti-backlash for achieving zero backlash in accordance with the principles of the present invention.

FIG. 6 is an orthographic view of another embodiment of the anti-backlash device of the present invention depicting a method for achieving zero backlash in accordance with the principles of the present invention.

Anti-backlash device 55 shown in FIG. 6 utilizes a plurality of cylindrical, coin-shaped rollers 54, 58; a pressure actuator 42 having a retaining ring 38 and a wave spring 39, and a cradle 41—shown in a sectional view—cooperatively working together to preload a two-starts screw 26.

The components of the anti-backlash device in the embodiment 55 shown in FIG. 6 are identical to those described heretofore in relation to FIG. 5 and are therefore not repeated here.

Force exerted on the pressure actuator is transferred to the helical rolling surface indicated here as P2 (shown by arrows) on the outer, cylindrical surfaces (shown spotted only for visual clarity) of the plurality of cylindrically-shaped rollers 54, arranged in a series on an upper thread face 56 (shown spotted for clarity) of roller screw 26, to apply a line of pressure (small dark arrows to indicate direction) against upper thread face 56 (shown spotted for clarity only); while simultaneously pressure is exerted by the helical rolling surface P1 (shown by arrows) from cradle 41 on the outer, cylindrical surface (shown striped only for visual clarity) of a second series of cylindrically-shaped rollers 58, positioned on an adjacent, lower thread face 60 (shown striped for visual clarity) to apply a counter-force line of pressure (small dark arrows to indicate direction) to the upper thread face 56 of the same screw thread 74.

Pressure is thus applied to the plurality of cylindrically-shaped rollers 54, 58 in two opposing directions at a predetermined axial, balanced force on the ball roller screw 26 so as to restrain any possible backlash effect.

Figure 7:
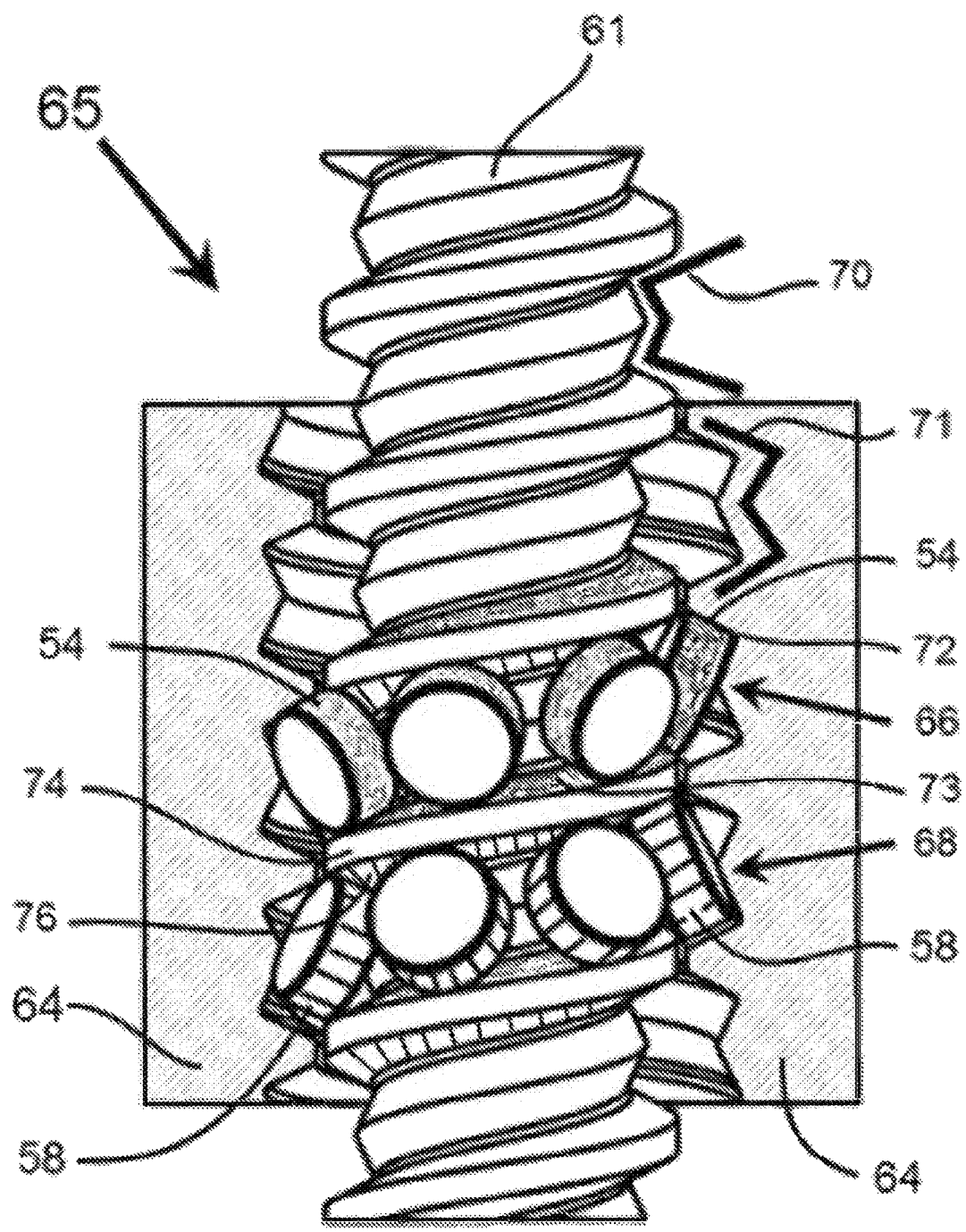
FIG. 7 shows a partial cutaway view of a nut housing a one-start screw to focus on the method of the invention in a further embodiment of the present invention.

FIG. 7 shows a partial cutaway view of a cradle housing a one-start roller screw to illustrate the method of the invention in another embodiment of the anti-backlash device. Anti-backlash device 65 utilizes a roller screw 61 provided with a W-shaped screw thread profile 70 complemented by and meshing with an M-shaped cradle thread profile 71 defining a retaining pathway for cross-hosting a plurality of shaped rollers 54, 58. One-start roller screw 61 is provided with a W-shaped screw thread 70 (indicated by dark letter W), whereas a cradle 64 is provided with a mirror-image, M-shaped, cradle thread 71 (indicated by dark letter M) so that cross-hosting is enabled of the plurality of cylindrical, coin-shaped rollers 54, 58 (shown spotted and striped, respectively, only for clarity of view).

As shown in FIG. 7, a first series 66 (shown spotted only for clarity) of the plurality of cylindrically-shaped rollers 54 are arranged so that each of their cylindrical surfaces 72 forms a stable line of contact with an upper face 73 (shown spotted only for clarity of view)) of screw thread 74, by way of example, even when the plurality of cylindrically-shaped rollers 54 are impelled to roll.

A second series 68 (shown striped only for clarity of view) of a plurality of cylindrically-shaped rollers 58 are arranged so that the cylindrical surfaces (shown striped) in this second series 68 also form a stable line of contact with a lower face 76 ((shown striped only for clarity of view)) of screw thread 74. The combination of the two series 66, 68 rolling in parallel and pressing on opposite faces 73, 76 of the same screw thread 74 provides a counterbalanced force that axially prevents backlash while utilizing only the W-shaped screw grooves 70 and meshing M-shaped cradle grooves 71 to retain the shaped rollers 58 while rolling in a continuous guided helical pathway around roller screw 61.

Figure 8:
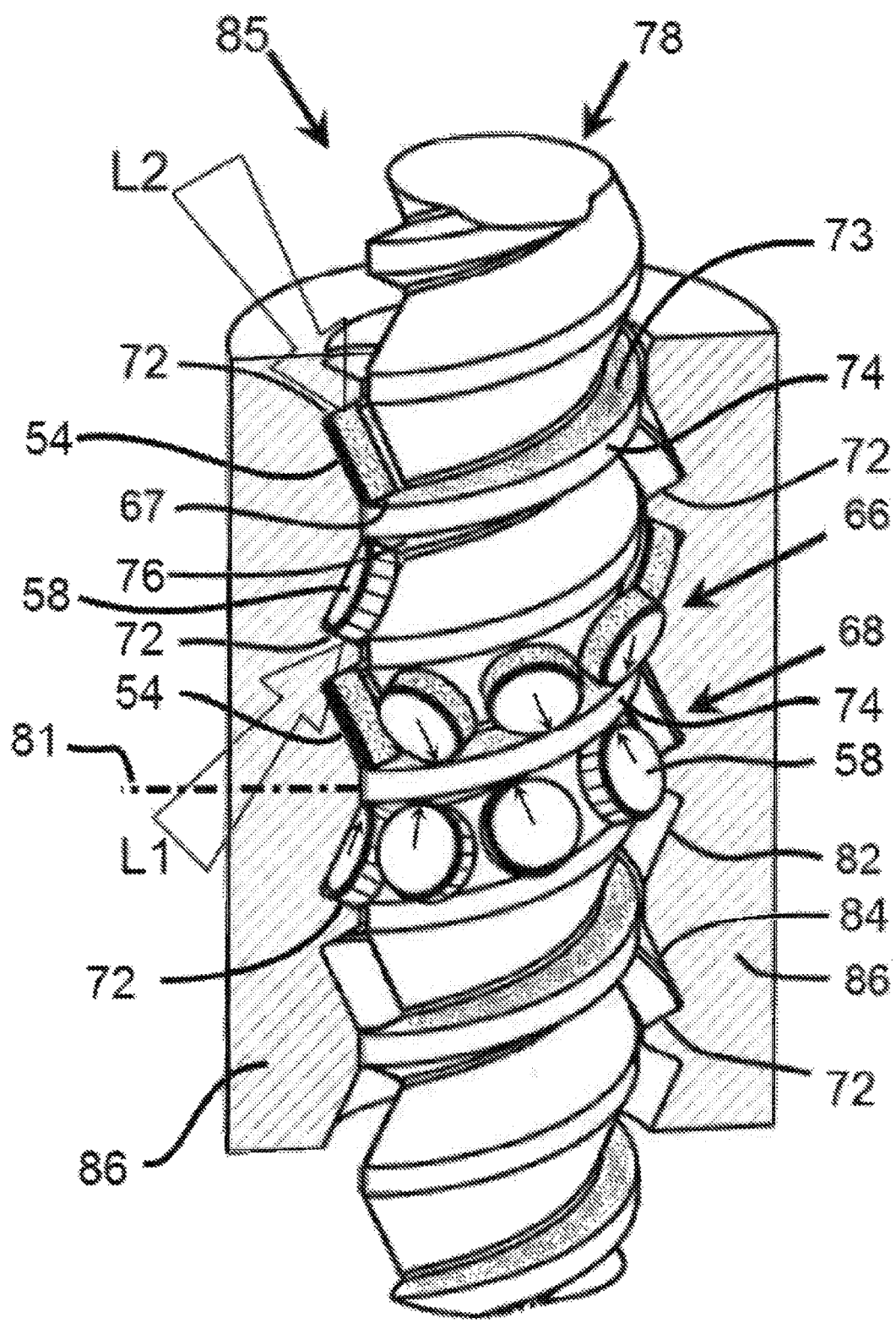
FIG. 8 shows an orthographic view of a two-starts roller screw in combination with a corresponding cradle, shown in a sectional view, in another embodiment of an anti-backlash device.

FIG. 8 shows an orthographic view of a two-starts roller screw in combination with a corresponding cradle, shown in a sectional view, in another embodiment of an anti-backlash device to illustrate the method of FIG. 7 to achieve zero backlash in accordance with the principles of the present invention.

The embodiment of the invention shown in FIG. 8 differs from that in FIG. 7 mainly in that a two-starts roller screw 78, rather than a one-start roller screw 61 as used in FIG. 7. Both FIG. 7 and FIG. 8 use a plurality of cylindrically-shaped rollers 54, 58 (shown with contrasting markings for clarity of view only) which are oriented at opposing angles to each other in two, parallel, adjacent series 66, 68. This arrangement applies pressure on screw thread 74 in both axial and radial directions utilizing pressure at the lines of contact (indicated by dark arrows on cylindrically-shaped rollers 54, 58) formed by the cylindrical axial faces 67, 72 (indicated as spotted and striped, respectively, for visual clarity) of the plurality of cylindrically-shaped rollers 54, 58 when rolling on upper and lower, oppositely oriented screw thread faces 73, 76, respectively.

Screw face 73 is oppositely oriented in relation to screw face 76 about a symmetric line 81, as are cradle threads 82 which are matched to screw threads 74. Due to their orientations at opposing angles, the plurality of cylindrical, coin-shaped rollers 54 in the embodiment 85 of the anti-backlash device shown in FIG. 8 have a line of contact 67, 72 with at least one of or both roller screw 78 and cradle 86 and so can advantageously provide for heavy, load-bearing support (against pressure points indicated by light arrows, L1, L2), whereas, prior art ball rollers have only point contact with the thread faces of the ball screw and nut mechanism and fewer contacts in total. This makes the prior art ball screw and nut mechanism less efficient and less effective than the anti-backlash device of the present invention.

Figure 9:
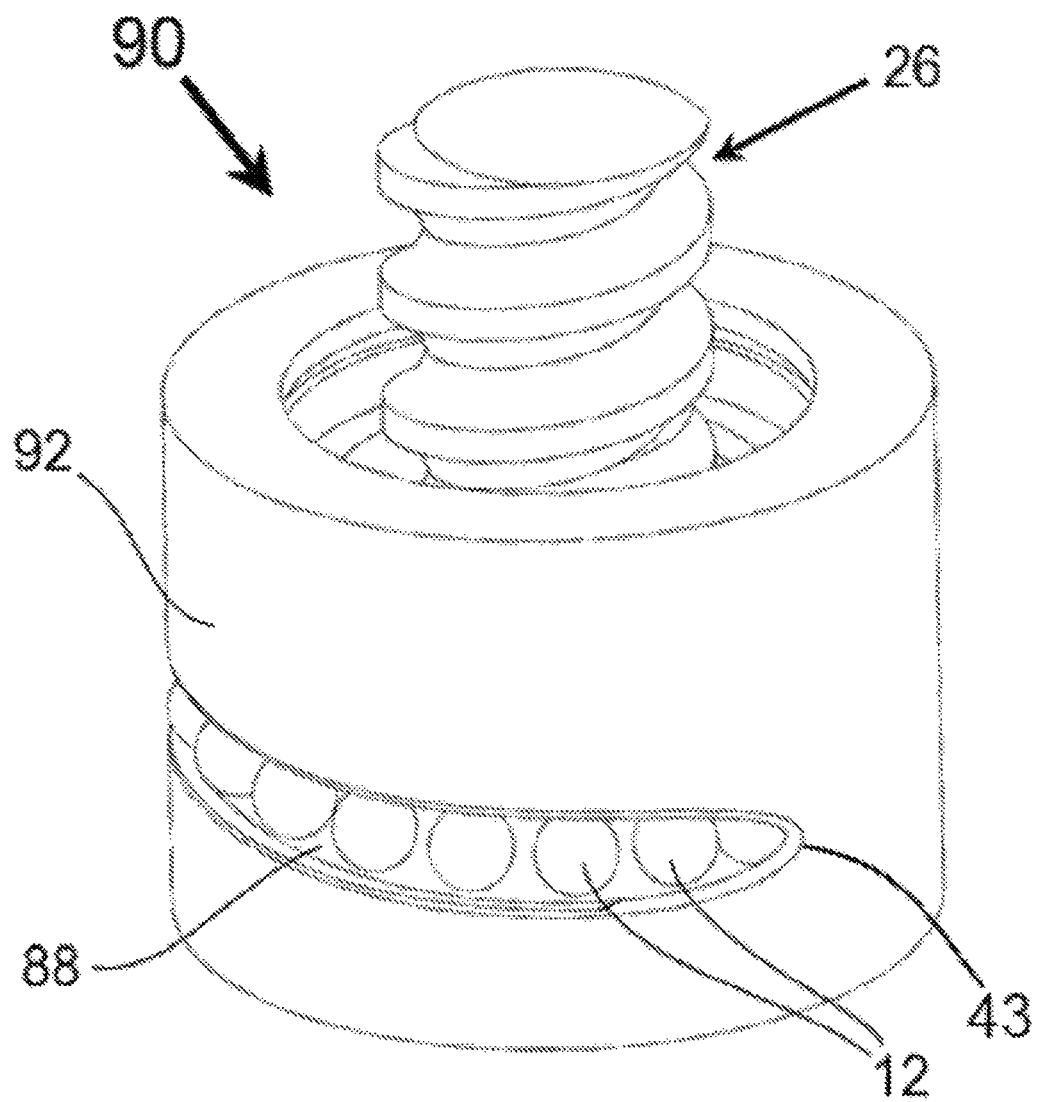
FIG. 9 is an orthographic view of an embodiment of the present invention where an outer cradle sleeve cover of an anti-backlash device has been removed to expose to view a plurality of ball rollers fully embedded within a helical return pathway of a cradle.

FIG. 9 is an orthographic view of another embodiment of the present invention showing an anti-backlash device with ball rollers fully embedded within an internal, helical pathway of a cradle.

Figure 17:
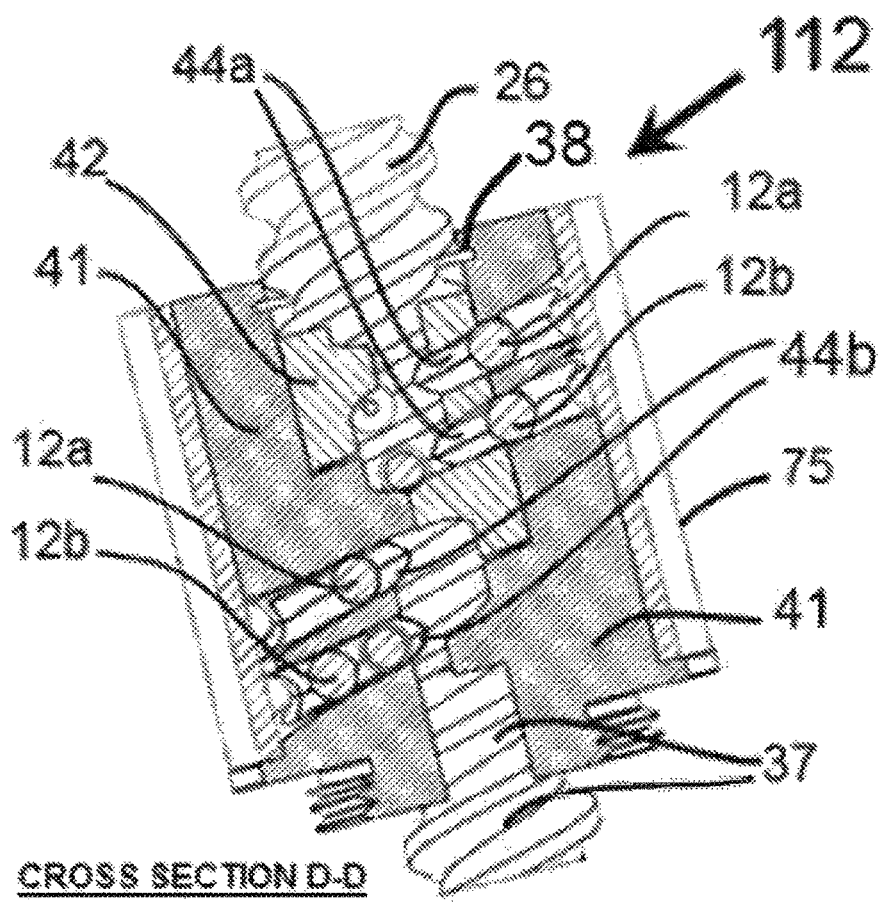
FIG. 17 is a general top view of the two-starts ball roller screw as shown in FIG. 16 and a cross-sectional view D-D view of the assembled device that shows the inward/outward, tangent flow of the rollers in the present invention.
Figure 17:
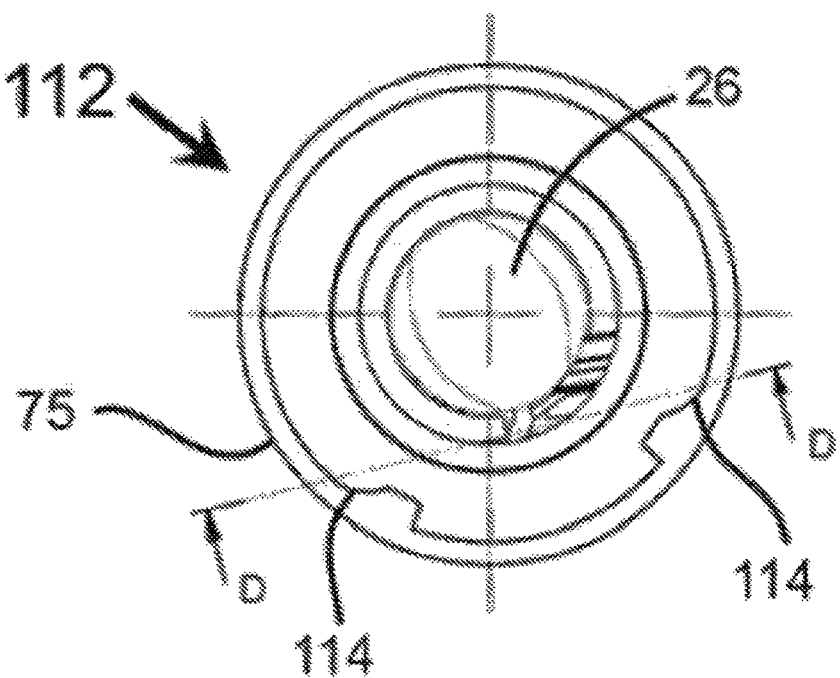
Figure 18:
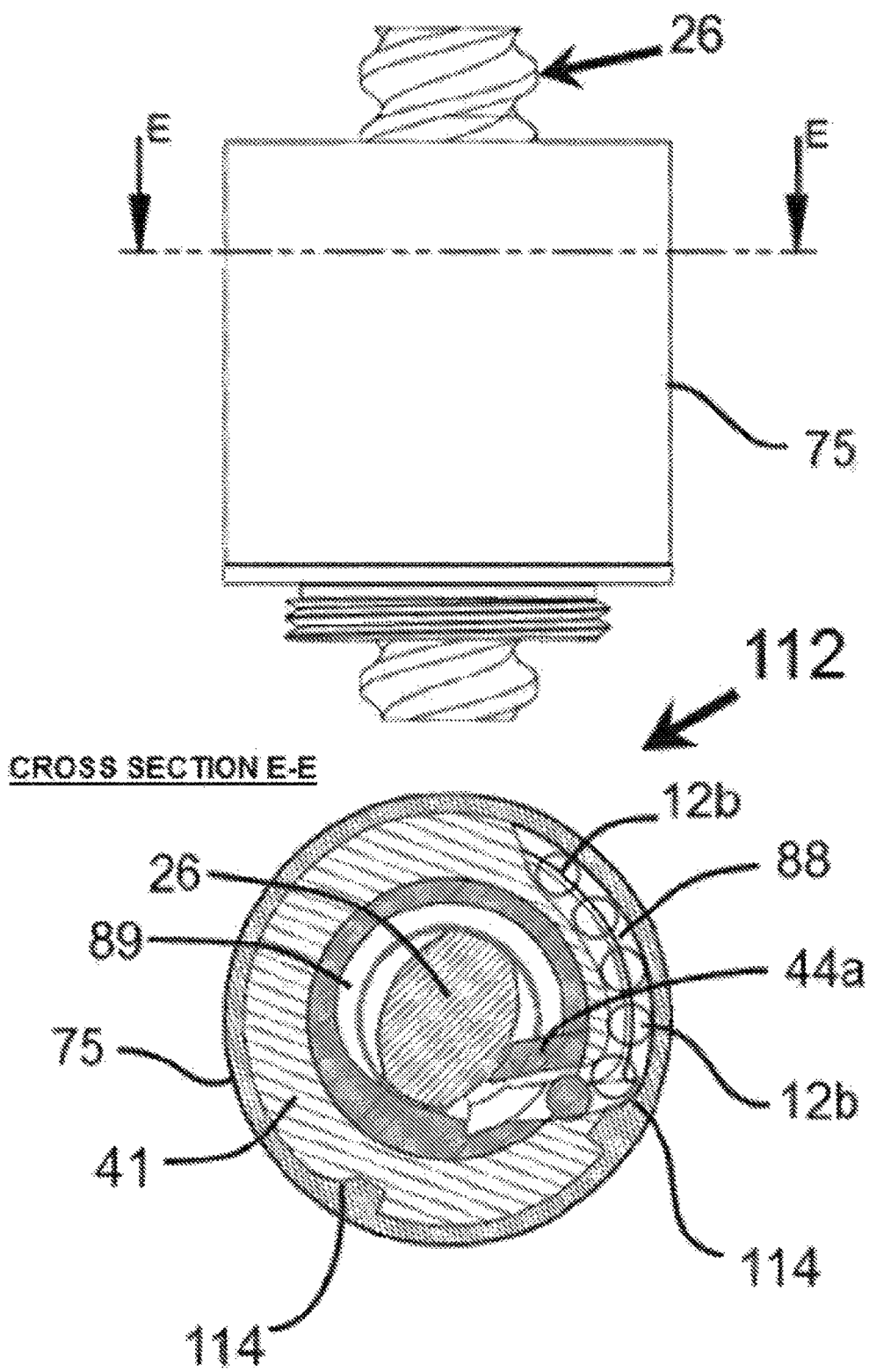
FIG. 18 is a general orthographic view of the embodiment of the present invention shown in FIG. 17, and a cross-sectional view E-E thereof to illustrate the disposition of the internal components.

The ball rollers 12 are exposed to view in a partial cut-away view 43 when seen without a cradle sleeve cover 75 (see FIGS. 17-18). The anti-backlash device embodiment 90 of the present invention exemplifies a fully embedded returning circuit 88 in cradle 92 for a plurality of ball rollers 12. Cradle 92 houses a ball roller screw 26 in an alternate, compact structural arrangement for the plurality of ball rollers 12 in anti-backlash device 90 in accordance with the principles of the present invention.

Figure 10:
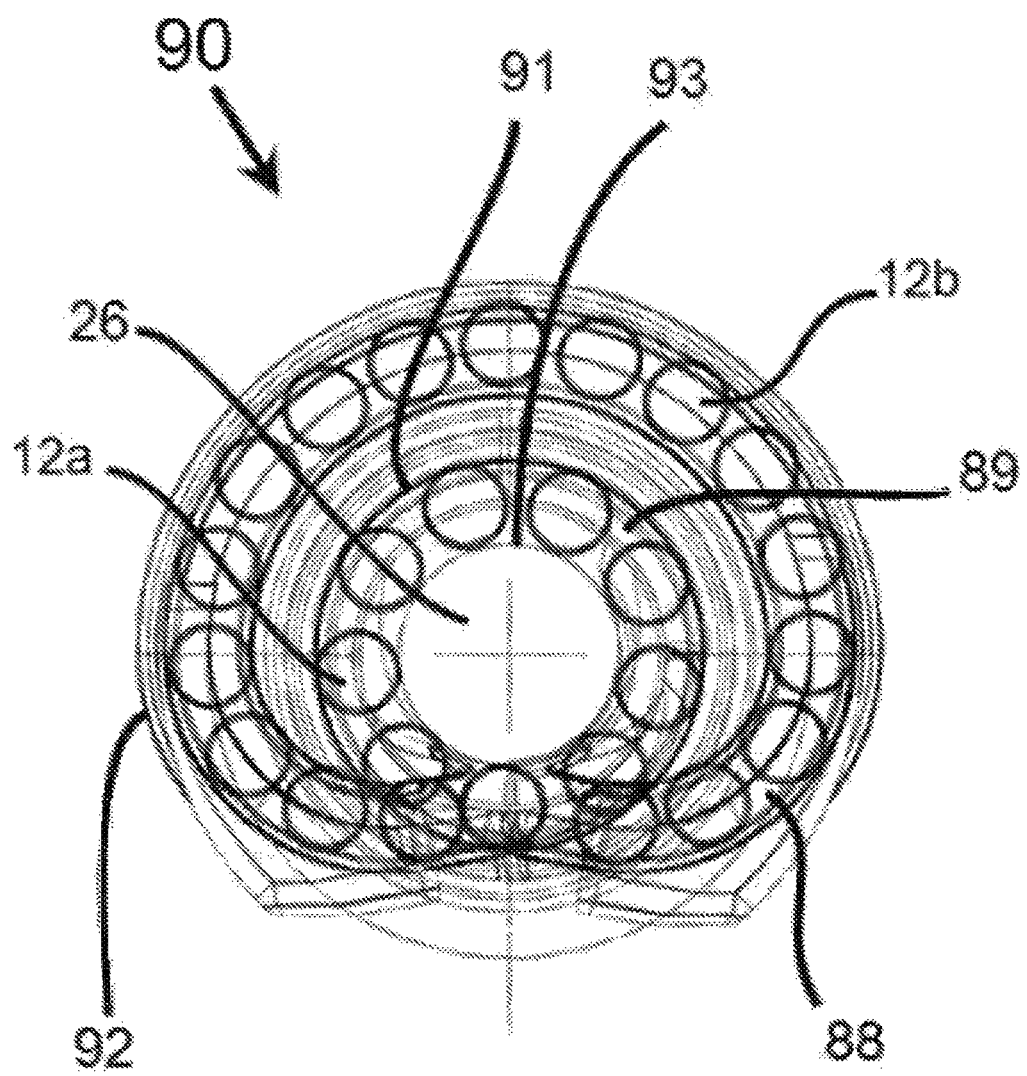
FIG. 10 is a schematic, cross-sectional, view illustrating the internal rolling motion using conventional ball rollers in the anti-backlash device as shown in FIG. 9.

FIG. 10 is a schematic, cross-sectional view illustrating the internal rolling motion for ball rollers as in the anti-backlash device of the present invention shown in FIG. 9.

Embodiment 90 of the present invention shows a general, representative illustration of the rolling motion of a plurality of ball rollers 12a in a helical, active circle 89 where the plurality of ball rollers 12a are disposed so as to be in contact with the screw threads (not shown) of ball screw 26 between the screw inner diameter 93 and the cradle thread outer diameter 91. The complementary thread grooves (not shown) of cradle 92 (see FIG. 9) in combination with the ball screw thread grooves (not shown) define the helical active circle 89 of about 360 degrees and a helical returning circuit 88 also of about 360 degrees. Returning circuit 88 is where the plurality of ball rollers 12b are returned to the helical, active circle 89 and recycled in a continuous, rolling motion around ball screw 26. Alternatively, the helical returning circuit 88 may be formed between the cradle 92 and a cradle cover 75 (see FIG. 17).

Figure 11:
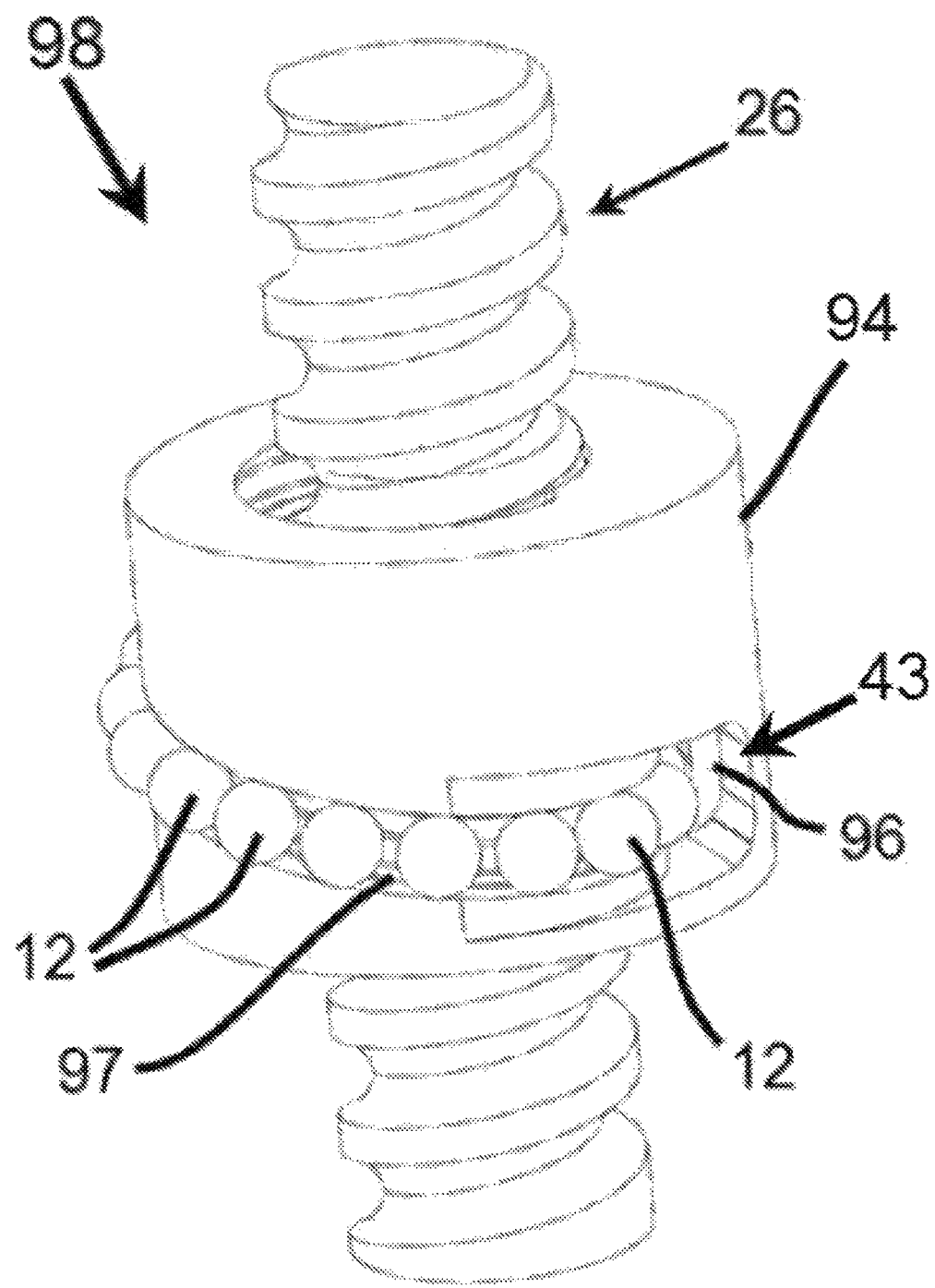
FIG. 11 is a general, orthographic view of another embodiment of the present invention.

FIG. 11 is a general, orthographic view of another embodiment of the present invention. anti-backlash device in embodiment 98 reveals, in an exposed view, a plurality of ball rollers 12 in an outer, half-depth, helical returning circuit 97 partially embedded externally to cradle 94, and a cut-away view 43 of the plurality of ball rollers 12 in a returning circuit rolling into an inner, active circle 89 (see FIG. 10) within cradle 94 for rolling around ball roller screw 26 in about a 360-degree continuous helical circle.

Figure 12:
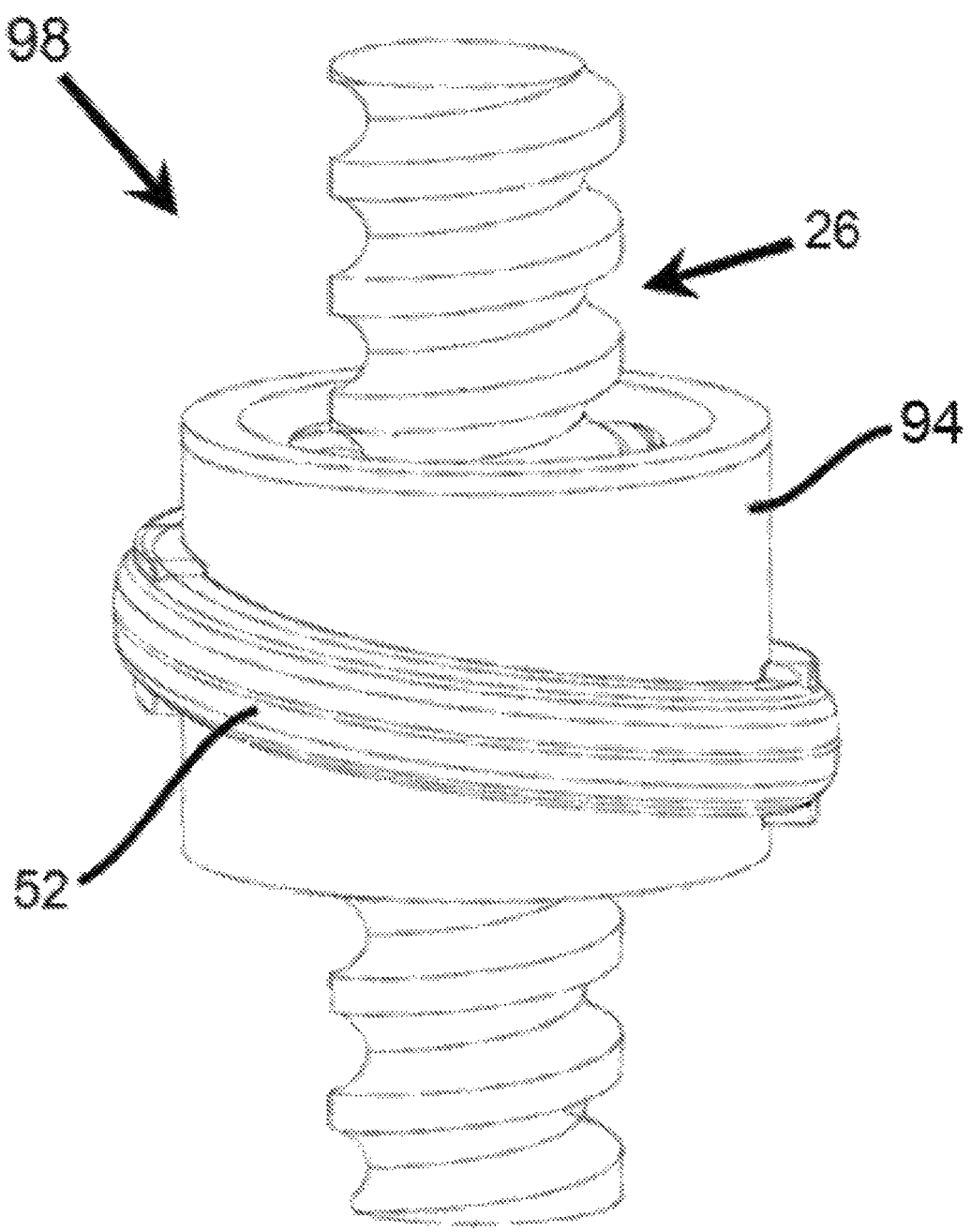
FIG. 12 is a general, orthographic view of an embodiment of the present invention as shown in FIG. 11, but herein provided with an exterior roller pathway cover mounted around the exposed ball rollers.

FIG. 12 is a general, orthographic view of the embodiment of the present invention as shown in FIG. 11, but herein provided with an exterior, cradle roller cover mounted around the exposed ball rollers (see FIG. 11). The cradle roller cover 52 is mounted externally around cradle 94 and acts to retain and guide the ball rollers 12 (see FIG. 11) in their course back to an interior, helical, active circle 89 (see FIG. 10) around ball screw 26.

Figure 13:
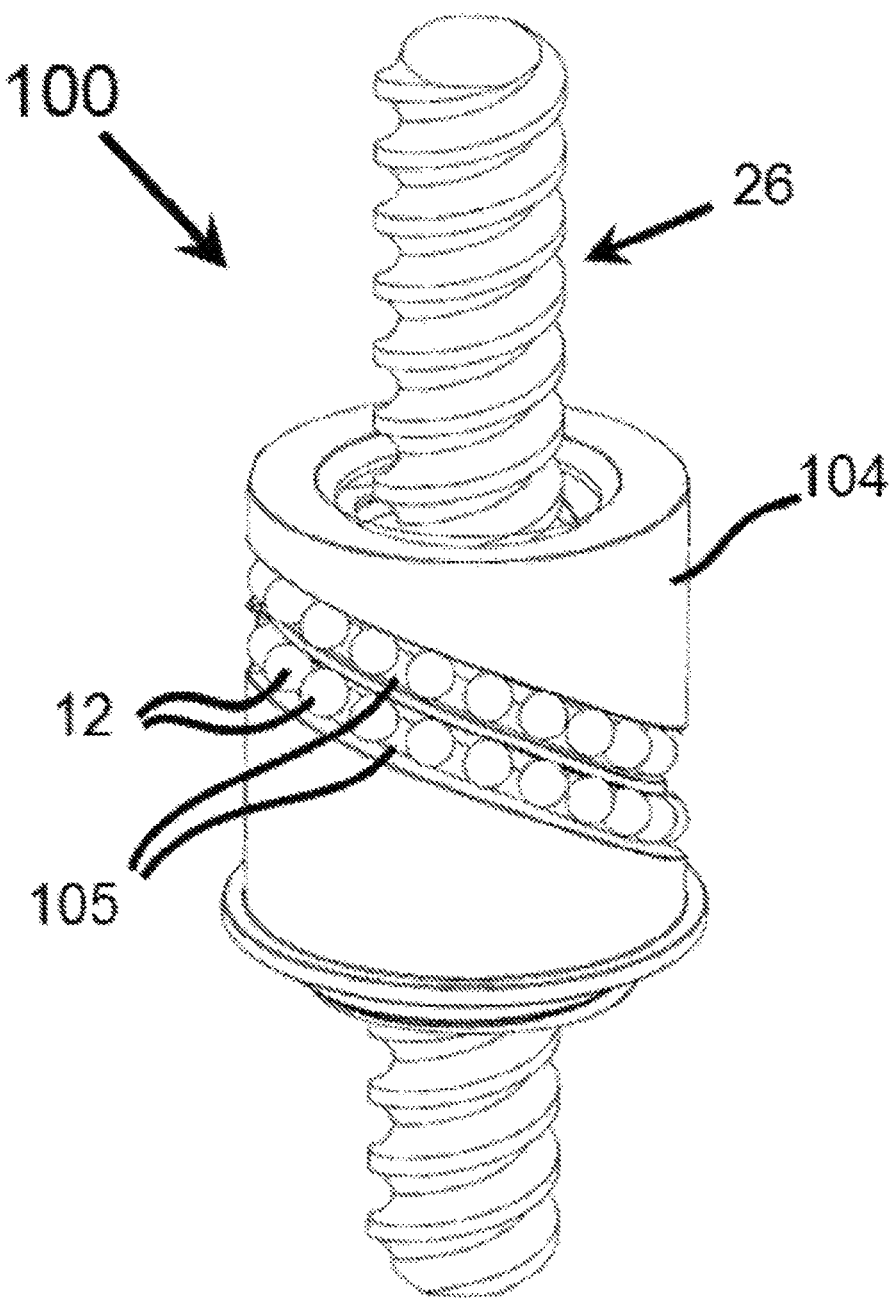
FIG. 13 is a general, orthographic view of yet another embodiment of the present invention.

FIG. 13 is a general, orthographic view of yet another embodiment of the present invention. anti-backlash device 100 comprises a two-starts roller screw 26 threaded and housed within a cradle 104 formed with parallel returning circuits 105 fully-embedded in cradle 104 to provide pathways for helical circulation of a plurality of ball rollers 12 in each around roller screw 26 in accordance with the principles of the present invention. The returning circuits 105 are shown exposed without their external cradle cover 52 (see FIG. 12).

Figure 14:
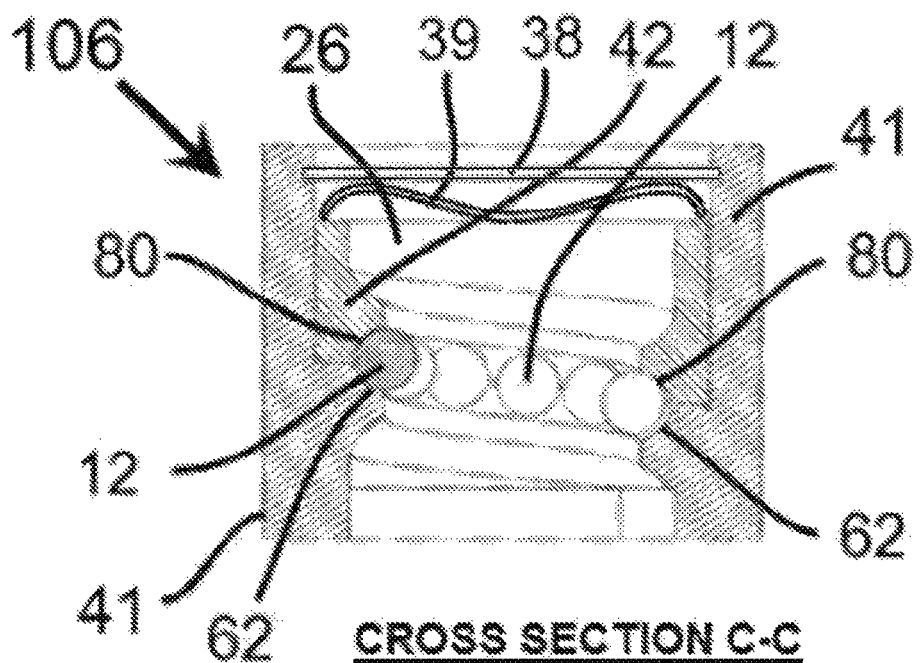
FIG. 14 is a general top view and a cross-sectional view C-C of still another embodiment of the present invention, illustrating the operational concept of a cylindrical pressure actuator in relation to a cradle to apply pressure to a plurality of ball rollers for zero backlash effect.
Figure 14:
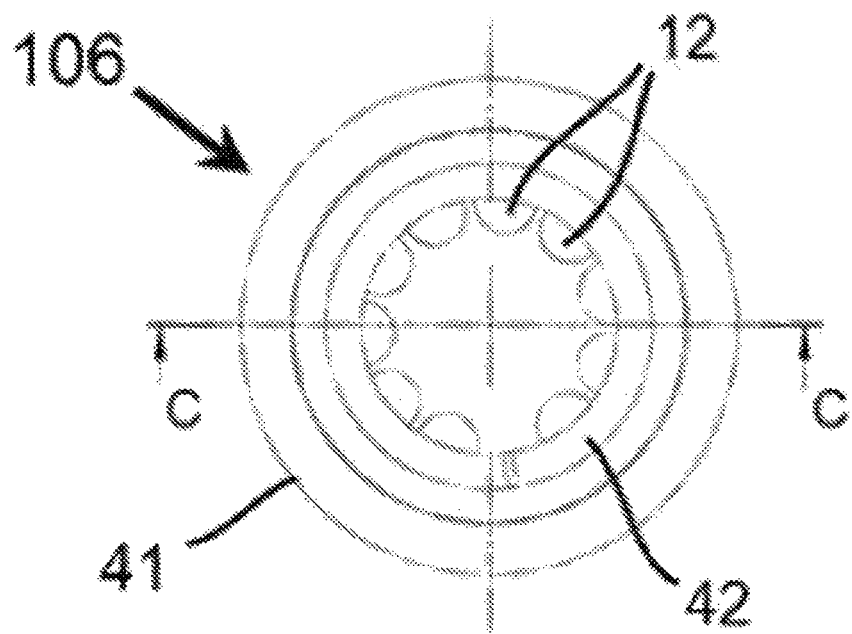

FIG. 14 is a general top view and a cross-sectional view C-C of still another embodiment of the present invention, illustrating the operational concept of a pressure actuator in relation to a cradle to apply pressure to a plurality of ball rollers for zero backlash effect in accordance with the principles of the present invention.

Pressure actuator 42 is shown in cross section C-C acting on a plurality of ball rollers 12 in a helical active circle 89 (see FIG. 10) arranged around ball roller screw 26. Pressure actuator 42 is impelled to move against both cradle 41 and the plurality of ball rollers 12 on a single, helical rolling surface 80, integrally formed in pressure actuator 42, from a predetermined force applied to it by a preloading means, such as wave spring 39 and further impelling the plurality of ball rollers 12 to be pressured by the combined opposing forces resulting in zero backlash on roller screw 26.

Figure 15:
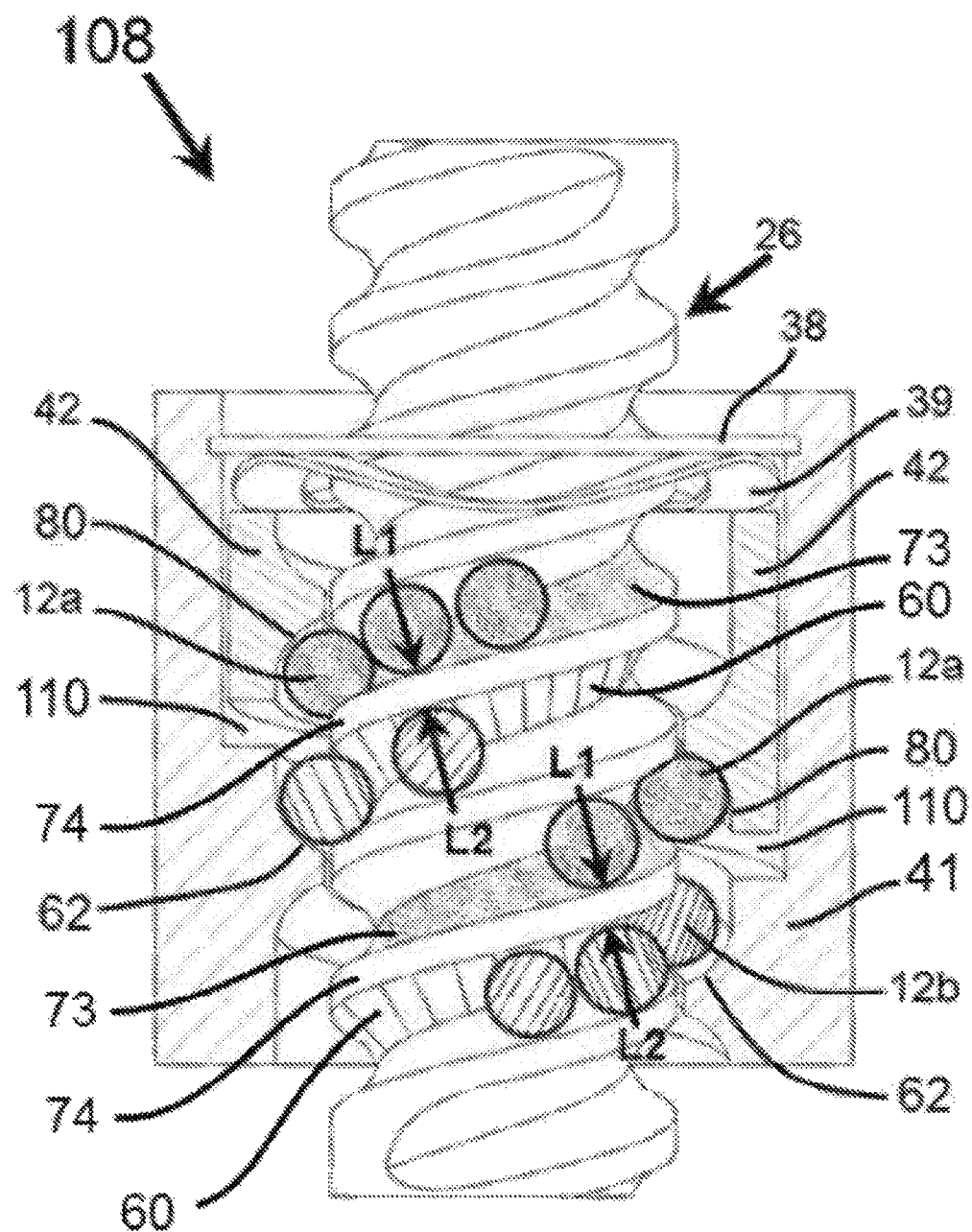
FIG. 15 is an orthographic view of the present invention utilizing a two-starts ball screw operating with a plurality of ball rollers, a cradle, a pressure actuator and a wave spring and retaining ring to provide a zero backlash effect in yet another embodiment of the present invention.

FIG. 15 is an orthographic view of a two-starts ball screw in another embodiment of the anti-backlash device of the present invention operating with a plurality of ball rollers, a pressure actuator assembly, and a cradle—shown in a sectional view—to provide a zero backlash effect when operated in accordance with the principles of the present invention.

Anti-backlash device 108 comprises: a preloading means, such as wave spring 39, which is secured in place on a cradle 41 by a retaining ring 38, and a cylindrical pressure actuator 42 that, when a predetermined pressure is applied by wave spring 39, forces pressure actuator 42 against the plurality of ball rollers 12*a* (shown as spotted for clarity) which are forced into contact with a helical rolling surface 80 integrally formed on pressure actuator 42. Pressure actuator 42 is provided with a clearance space 110 to allow movement between it and cradle 41.

Pressure actuator 42 applies pressure (indicated by a small dark arrow L1) in the direction of an upper thread face 73 (shown shaded for clarity) of a two-starts ball roller screw 26. Simultaneously, with the rotation of ball roller screw 26, the plurality of ball rollers 12*b* (shown striped for clarity) are constrained by a helical rolling surface 62 of cradle 41 which puts opposing pressure (indicated by small, dark arrow L2) upward on the lower thread face 60 (shown striped for clarity of view only) of ball roller screw 26. The pressure exerted on the plurality of ball rollers 12*a/b* from two opposing directions applies a predetermined axial, balanced force on helical screw thread 74 of ball roller screw 26 so as to restrain any possible backlash effect on anti-backlash device 108.

Figure 16:
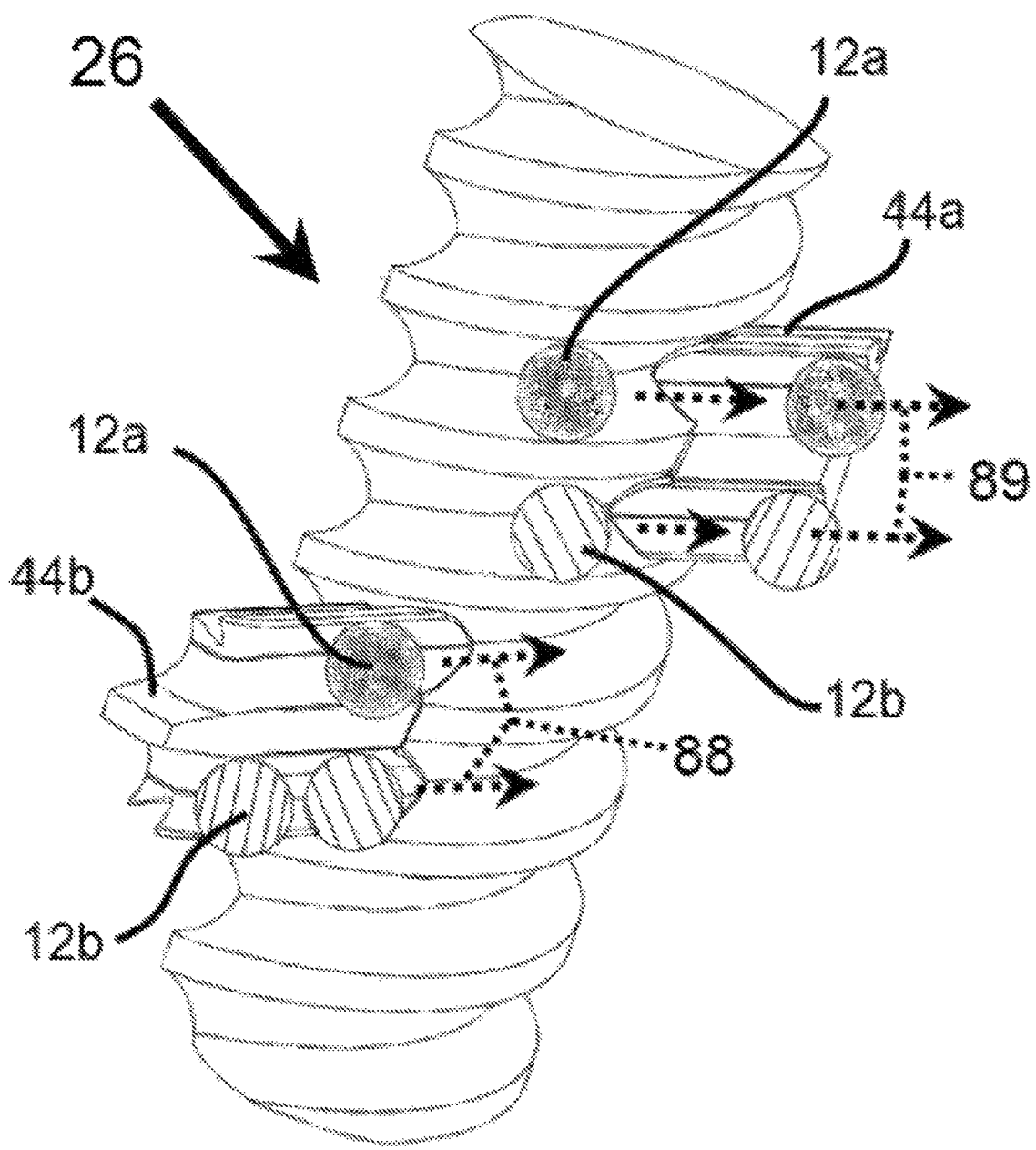
FIG. 16 is a simplified drawing showing only a the 2 starts ball screw component from FIG. 15 to indicate the relative disposition of two pairs of deflectors in relation to two series of a plurality of ball rollers.

FIG. 16 is a simplified drawing showing only the ball screw from FIG. 15 to indicate the relative disposition of two pairs of deflectors in relation to a plurality of ball rollers arranged in two, parallel, helical, active circles around the ball screw.

A first deflecting means 44*a*, comprising a pair of twin finger-like deflectors, is mounted on pressure actuator 42 (see FIG. 15) and a second, similar deflecting means 44*b* is mounted on a cradle 41(as seen in FIG. 15) of ball roller screw 26 and positioned to deflect a plurality of ball rollers 12*a* and 12*b* (marked—for clarity only—as spotted and striped, respectively,) so as to impel them to roll away from the helical, active circles 89 (indicated by a first bracket) and going into two, parallel, helical returning circuits 88 (indicated by a second bracket) after about a 360 circle around ball roller screw 26 in a continuous rolling motion.

FIG. 17 is a general top view of the two-starts ball roller screw as illustrated in FIG. 16 and a cross-sectional view D-D of an assembled roller screw and cradle in another embodiment of the present invention.

The embodiment of the anti-backlash device 112 in FIG. 17 shows a ball roller screw 26 threaded into a cradle 41 enclosed in an external cover sleeve 75. Two pairs of deflector means are provided which, by way of example, comprise finger-like deflectors 44*a/b* to deflect a plurality of ball rollers 12*a* and 12*b* from two, parallel, helical active circles 89 (see FIG. 16) going towards (arrows) two, helical, returning circuits 88 (see FIG. 16).

The ball rollers 12*b* represent a plurality of such rollers being deflected by the finger-like deflectors 44*a* to an outlet (not shown) in the active circle 49*a* (see FIG. 4). A similar inlet (not shown) in the returning circle 49*b* (see FIG. 4) also utilizes a pair of finger-like deflectors 44*b* to direct two, parallel series of a plurality of ball rollers 12*a* disposed in adjacent, screw threads 37 (shown in cross-section D-D) around ball roller screw 26. Finger-like deflectors 44*a/b* are assisted by curved elbows 114 (seen in top view) strategically formed about the inner circumference of cradle sleeve cover 75. Curved elbows 114 are located between the active circle 49*b* (see FIG. 4) of ball roller screw 26 and the returning pathway for the ball rollers 12*a*.

FIG. 18 is a general orthographic view of the embodiment of the present invention shown in FIG. 17, and a cross-sectional view E-E thereof to further illustrate the disposition of the internal components.

In cross-section view E-E, only one of the pair of deflection means, such as finger-like deflectors 44*a/b* (see FIG. 17), is visible, but both are present within anti-backlash device 112. An external cover sleeve 75 is provided with a pair of curved elbows 114 oriented so as to be tangential to both the finger-like deflectors 44*a/b* and the inside surface of cover sleeve 75 and to operate in tandem. Cover sleeve 75 covers cradle 41 and retains the plurality of ball rollers 12*b* within a helical returning circuit 88, which is seen exposed in a partial cutaway view of cross-section E-E.

Deflectors 44*a* (and 44*b* which is not visible), together with the pair of curved elbows 114, smoothly transfer the plurality of ball rollers 12*b* (and 12*a* which is not visible)—together with the pair of curved elbows 114—from helical returning circuit 88 to an innermost active helical circle 89 in a continuous circuit in accordance with the principles of the present invention. The plurality of ball rollers 12*a/b* are preloaded into the anti-backlash device 112 to promote zero backlash.

Figure 19:
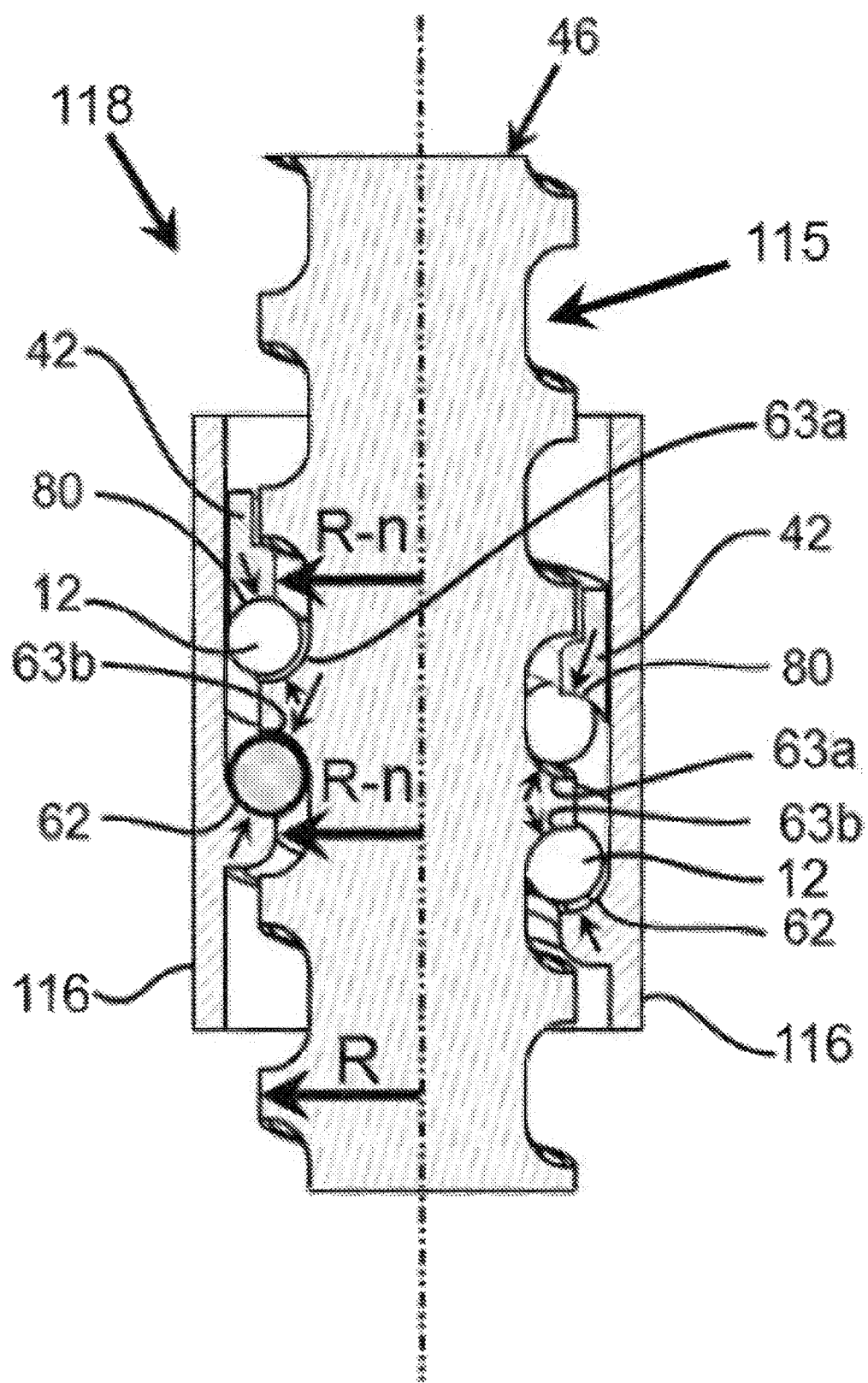
FIG. 19 is sectional view of still another embodiment of the present invention which is provided with a one-start, ball screw as seen along its central axis.

FIG. 19 is a sectional view of another embodiment of the present invention showing a one-start ball roller screw provided with a screw outside diameter larger than both the cradle thread inside diameter and the pressure actuator inside thread diameter.

Anti-backlash device 118 is provided with a pitch and profile where the outside diameter of ball roller screw 46 is larger than the inside diameter of cradle 116 resulting in a pressure angle that is close to parallel to the screw axis (dashed line) at about 20 degrees of arc. In the prior art this pressure angle is about 45 degrees of arc. The pressure angle has a significant effect on the properties of the ball roller screw 46 such as reducing Hertz contact effects between the plurality of ball rollers 12, ball roller screw 46 and cradle 116 while also reducing rolling friction in the system, and increasing the system life-time and efficiency.

It should be noted that the line of active contact at or about 20 degrees of arc as in the present invention is quite advantageous for applications requiring dealing with heavy loads. This distinction is important for the option to increase the weight of loads in heavy duty applications when the active line of contact is closer to the vertical upon the plurality of ball rollers 12. Radius R of ball roller screw 46 measured radially from a central axis (axis line indicated) shows that the external diameter of ball screw 46 is larger than that of both the internal thread diameter, indicated by radius R-n, of pressure actuator 42 and the internal thread diameter of cradle 116.

A helical rolling surface 62 of cradle 116 is formed integrally with the inner-face of cradle 116 oriented towards ball roller screw 46, so the plurality of ball rollers 12 are sustained from below while the semi-square, helical threads 63a/b of ball roller screw 46 similarly apply pressure on ball rollers 12 between cradle 116 and ball roller screw 119 when pressure actuator 42 is activated. Force is then exerted on the plurality of ball rollers 12 in two opposing directions from ball roller screw 46 at contact points (marked with dark arrows) to apply a predetermined axial, balanced force on ball roller screw 46 so as to restrain any possible backlash effect on anti-backlash device 118.

Figure 20:
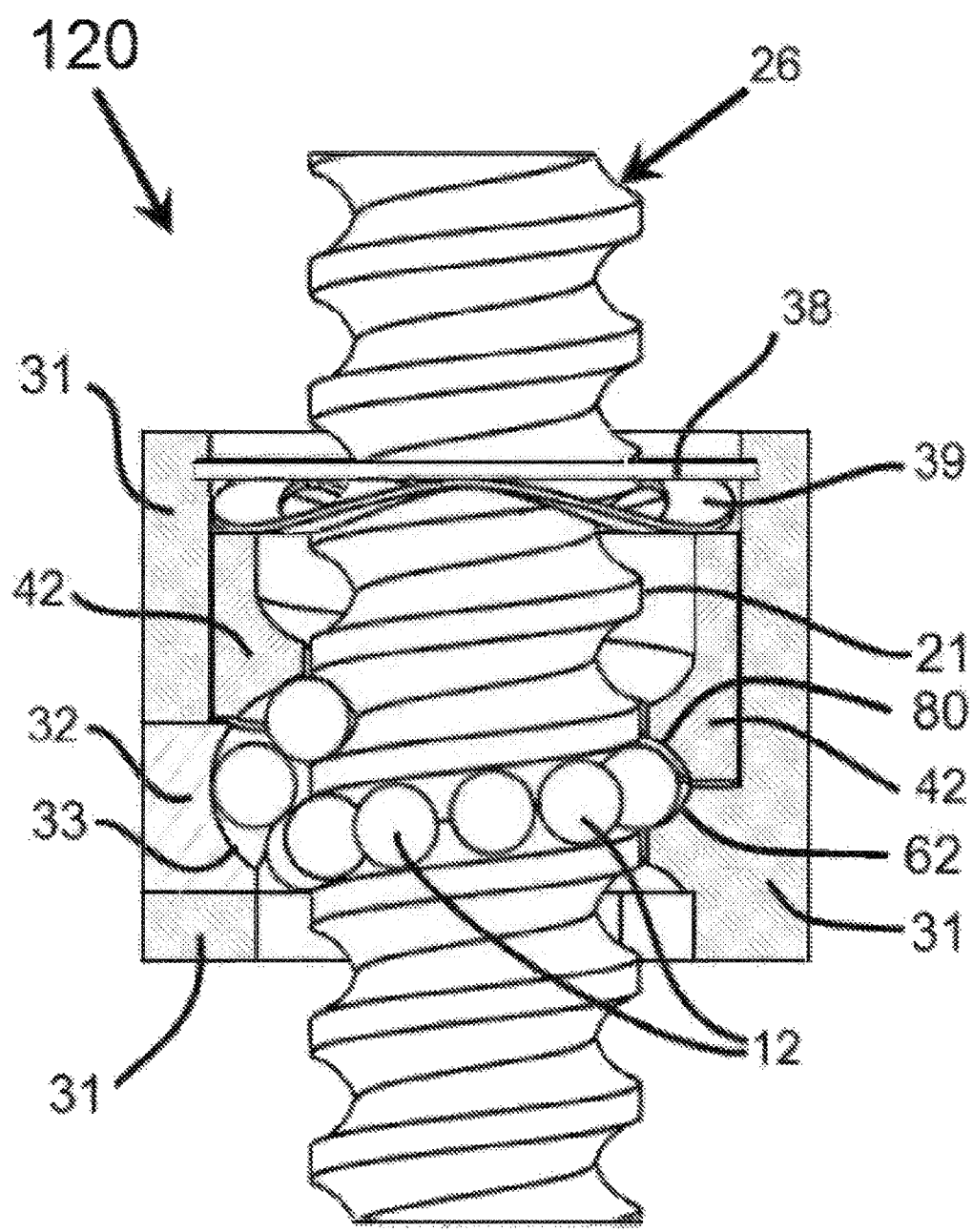
FIG. 20 shows an orthographic view of a one-start ball screw and a sectional view of a related cradle housing for the ball screw in still another embodiment of the present invention.

FIG. 20 shows an orthographic view of a one-start ball roller screw and a sectional view of a corresponding cradle housing with a prior art deflector means incorporated and adapted to the present invention. Cradle 31 is provided with a plurality of ball rollers 12 designed to flop-over screw thread 21 (which is the screw thread with the largest outside diameter) aided by a deflector means 32 comprising a concave interior surface 33 of cradle 31 that deflects the plurality of ball rollers 12 directly back to the helical active circle 89 (see FIG. 10). The deflector means 32 may be integrally formed with cradle 31 or, as shown in FIG. 20, comprise an add-on piece (shown with alternate shading).

The spring-driven pressure actuator 42, is formed with a helical rolling surface 80, and provided with a wave spring 39 and retaining ring 38, the whole comprising a pressure actuator assembly as described heretofore in other embodiments of the anti-backlash device of the present invention.

The cradle 31 which houses the pressure actuator assembly is also formed with a helical rolling surface 62 to apply pressure to the plurality of ball rollers 12 when anti-backlash device 120 is operated. The concave surface 33 and cross-over deflecting element 32 are seen to be readily adaptable for use with the finger-like type deflector 44a/b (see FIG. 17).

Although anti-backlash device 120 in the embodiment of the present invention shown in FIG. 20 tends to be more compact than the other embodiments of the present invention, it offers a choice in some applications where overall volume or size of an anti-backlash device is critical. Yet utilizing the anti-backlash device 120 of the present invention including the components: cradle 31, pressure actuator 42, and wave spring 39 with its retaining ring 38 makes it far more efficient as well as more effective in controlling any backlash effects as compared to prior-art ball screws.

Figure 21:
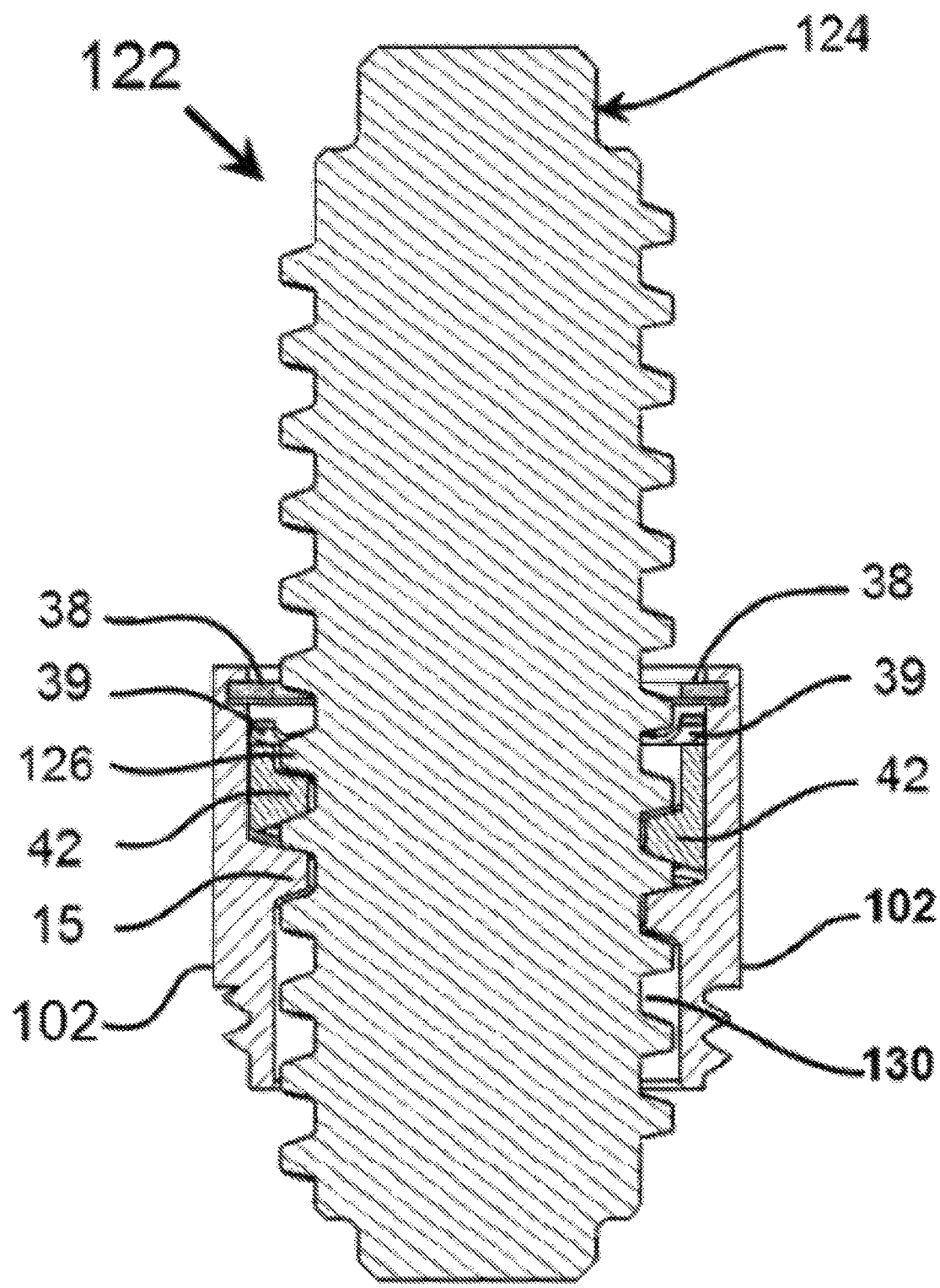
FIG. 21 is a cross-sectional view of an alternate embodiment of the present invention using an anti-backlash device with an Acme lead screw.

FIG. 21 is a cross-sectional view of another embodiment of the present invention utilizing an Acme lead screw in combination with the cradle and pressure actuator assembly of the present invention to form an anti-backlash device that operates in accordance with the principles of the present invention.

Referring now to FIG. 21 in detail there is illustrated an Acme lead screw 124 shown threaded with helical teeth grooves 130 within a cradle 102 which also houses a pressure actuator assembly comprising pressure actuator 42; retaining ring 38; and a pre-loading means, such as wave spring 39.

Pressure actuator 42 is loaded by wave spring 39 so as to be deflected downward upon the teeth 126 of Acme lead screw 124 and with an inner helical tooth 15 formed on cradle 102 to provide an anti-backlash effect using the teeth 126 of Acme lead screw 124 acting as a counterforce in the grooves 130 of Acme screw 124. The helical, tooth-like pressure actuator thread (integral to and indicated by the same callout line for pressure actuator 42), the cradle inner helical tooth 15, and the screw thread teeth 126 of Acme lead screw 124 all combine to achieve the positive engagement and multiple sources of pressure upon contact among these respective components resulting in almost zero backlash when the anti-backlash device 122 is operated.

Figure 22:
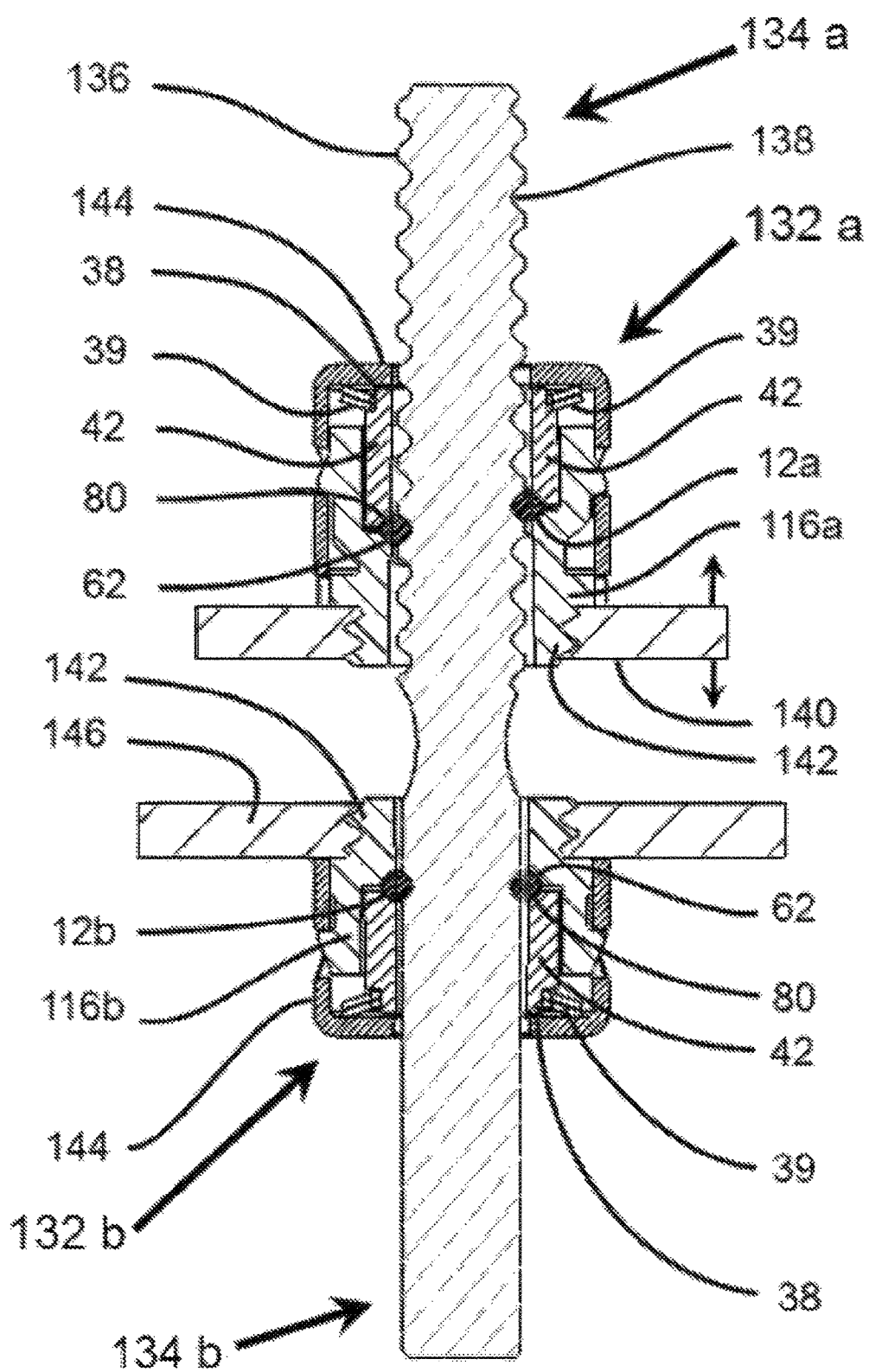
FIG. 22 is a cross-sectional view of yet another embodiment of the present invention.

FIG. 22 is a cross-sectional view of another embodiment of the present invention illustrating a combination of a first and a second anti-backlash device of the present invention mounted on the same ball roller screw, but oriented in opposing axial directions; the second anti-backlash device being disposed on a lower portion of the roller screw and configured as an anti-backlash bearing support for the roller screw.

A first anti-backlash device 132a is disposed on a threaded end 134a of ball roller screw 134a/b. A second anti-backlash device 132b is disposed on an unthreaded end 134b of the same roller screw 134a/b and houses a screw support bearing for ball roller screw 134a/b.

The threaded end 134a of roller screw 134a/b is provided with helical screw threads 136 and thread grooves 138 for mechanical connection to the first anti-backlash device 132a, shown threaded into a load flange 140 which is free to move up or down axially (see arrows) in line with the axis of roller screw 134a/b. The components of anti-backlash device 132a comprise a cradle 116a provided with helical teeth 142 and a helical cradle rolling surface 62; a cylindrical pressure actuator 42 also provided with a helical rolling surface 80; a retaining ring 38; a wave spring 39; and a snap-fit cover 144.

The second anti-backlash device 132b further comprises a cradle 116b, a pressure actuator 42, a preloading means 39, such as a wave spring, a retaining ring 38, a plurality of ball rollers 12b, and a snap-fit cover 144.

The unthreaded end 134b of roller screw 134a/b is provided with a ring of ball rollers 12b partially embedded in ball roller screw 134a/b and disposed within the second anti-backlash device 132b which serves as a roller screw axial support bearing that helps stabilize ball roller screw 134a/b and enables it to rotate with ease when held by pressure from cradle rolling surface 62 and pressure actuator rolling surface 80 within the second anti-backlash device 132b.

It should be noted that the plurality of ball rollers 12b are not arranged helically as the ball rollers 12a in the first anti-backlash device 132a, but form an annular circle around the axis of roller screw 134a/b at the lower portion 134b. The cradle 116b of anti-backlash device 132b is shown threaded into a fixed work bed 146 so as to maintain the axial, anti-backlash stability of both ball roller screw 134a/b and the load itself as it rotates when in operation.

The combination of the two anti-backlash devices 132a/b enables greater stability and control over the anti-backlash operation of roller screw 134a/b and the moving load.

Having described the present invention with regard to certain specific embodiments thereof, it is to be understood that the description is not meant as a limitation, since further modifications may now suggest themselves to those skilled in the art, and it is intended to cover such modifications as fall within the scope of the claims of the described invention and the various descriptions and drawings presented herein.

The invention claimed is:

1. An anti-backlash device for preventing backlash in a screw and nut mechanism having a helical screw thread and used in converting rotary motion into linear motion, said anti-backlash device comprising:

a cylindrical, pressure actuator integrally formed with a helical thread;

a cylindrical cradle integrally formed with a helical, internal thread for meshing with said helical screw thread, said cradle being mounted around said screw, exterior to and in close proximity to said pressure actuator, wherein both said pressure actuator and cradle each have only one accurately machined face axially oriented inward toward said screw, and wherein when said screw is operated to rotate within said cradle, said helical, pressure actuator thread is loaded on said helical screw thread so as to exert pressure thereon in a first axial direction, while simultaneously pressure is applied in an opposing, second axial direction by said cradle internal thread when loaded on said helical screw thread, thereby applying a predetermined, axial, balanced force on said screw so as to prevent backlash.

2. The anti-backlash device as claimed in claim 1, wherein said pressure actuator and said cradle have at least a single-turn helical thread formed in about a 360-degree arc.

3. The anti-backlash device as claimed in claim 1, wherein said anti-backlash device further comprises an active, pre-loading means housed in a compact case comprising said cradle.

4. The anti-backlash device as claimed in claim 3, wherein said preloading means, supported by a retainer, axially backs said pressure actuator in a predetermined force on said screw to prevent backlash.

5. The anti-backlash device as claimed in claim 1, wherein said screw comprises an Acme lead screw.

6. The anti-backlash device as claimed in claim 1, wherein said screw comprises a roller screw configured with roller screw threads for providing races for continuously rolling a plurality of shaped rollers in about a 360-degree arc active helical circle and about a 360-degree arc returning circuit around said roller screw in conjunction with said internal cradle thread when said roller screw rotates.

7. The anti-backlash device as claimed in claim 6, wherein said cylindrical pressure actuator has an axial degree of freedom, in order to act as an active preloading means when axially loading said plurality of shaped rollers against said roller screw in order to prevent backlash.

8. The anti-backlash device as claimed in claim 6, wherein said plurality of shaped rollers in both a single-start and a multiple start roller screw are profile-compatible with the profile of said internal cradle threads and said roller screw threads conjoined to form said races in given mechanical applications for use with said anti-backlash device to prevent backlash.

9. The anti-backlash device as in claim 6, wherein said plurality of shaped rollers are arranged around said roller screw in parallel, helical pathways to each other.

10. The anti-backlash device as in claim 6, wherein said plurality of shaped rollers in said active circle are arranged around said roller screw at a 90 degree angle to each other.

11. The anti-backlash device as in claim 6, wherein said plurality of shaped rollers is selected from at least one of the group comprising: balls, cylinders, coins, and diamond-shaped elements disposed in a variety of orientations as required by given mechanical applications.

12. The anti-backlash device as claimed in claim 6, wherein said preloading means and retainer are utilized to back said pressure actuator and control the axial freedom of said plurality of shaped rollers and the predetermined amount of load exerted on said plurality of shaped rollers among said pressure actuator, cradle and roller screw.

13. The anti-backlash device as in claim 6, wherein said roller screw is provided with a pitch and profile, wherein the outside diameter of said roller screw is provided with a larger outside diameter that is bigger than the inside diameter of said cradle and the pressure actuator, resulting in a low pressure angle of about 10-30 degrees of arc to the axis of said roller screw.

14. The anti-backlash device as in claim 13, wherein said larger outside diameter of said roller screw thread profile effects a reduction of Hertz effects among said shaped rollers, said roller screw and said cradle while reducing rolling friction, and increasing the system efficiency and longevity of said pressure actuator device.

15. The anti-backlash device as in claim 6, wherein said returning circuit for said plurality of shaped rollers further comprises: an extraction means, embedded slots disposed about the outer surface of said cradle, and an outer cover that covers said embedded slots.

16. The anti-backlash device as claimed in claim 6, wherein said screw is a ball roller screw provided with a combination of a first and a second anti-backlash device mounted on the same said screw, but oriented in opposing axial directions, wherein said first anti-backlash device is disposed on a threaded end of said screw and is operable on a load, wherein said second anti-backlash device is disposed on an unthreaded end of said ball roller screw and provided with a screw support bearing, and wherein when said second anti-backlash device is mechanically connected to a fixed work bed in alignment with the axis of said ball roller screw, said combination enables greater stability and control over the anti-backlash operation of said ball roller screw when rotated.

17. The anti-backlash device as claimed in claim 16, wherein said screw support bearing comprises an annular ring of a plurality of ball rollers partially embedded in said ball roller screw at said unthreaded end thereof and housed in an inner race of said second anti-backlash device, said plurality of ball rollers being confined between inner faces of the cradle and pressure actuator of said second anti-backlash device, said screw support bearing providing stable axial support to said ball roller screw.

* * * * *